US009246929B2

(12) United States Patent
Cappos et al.

(10) Patent No.: US 9,246,929 B2
(45) Date of Patent: Jan. 26, 2016

(54) PROVIDING A FAST, REMOTE SECURITY SERVICE USING HASHLISTS OF APPROVED WEB OBJECTS

(71) Applicants: Justin Cappos, Brooklyn, NY (US); Nasir Memon, Brooklyn, NY (US); Sai Teja Peddinti, Ozone Park, NY (US); Keith Ross, New York, NY (US)

(72) Inventors: Justin Cappos, Brooklyn, NY (US); Nasir Memon, Brooklyn, NY (US); Sai Teja Peddinti, Ozone Park, NY (US); Keith Ross, New York, NY (US)

(73) Assignee: Polytechnic Institute of New York University, New York, NY (US)

(*) Notice: Subject to any disclaimer, the term of this patent is extended or adjusted under 35 U.S.C. 154(b) by 93 days.

(21) Appl. No.: 14/021,393

(22) Filed: Sep. 9, 2013

(65) Prior Publication Data

US 2014/0173729 A1   Jun. 19, 2014

Related U.S. Application Data

(60) Provisional application No. 61/698,428, filed on Sep. 7, 2012.

(51) Int. Cl.
| | | |
|---|---|---|
| *G06F 7/04* | (2006.01) | |
| *H04L 29/06* | (2006.01) | |
| *H04L 9/32* | (2006.01) | |
| *G06F 21/62* | (2013.01) | |

(52) U.S. Cl.
CPC .......... *H04L 63/1408* (2013.01); *H04L 63/168* (2013.01); *G06F 21/6209* (2013.01); *G06F 21/6218* (2013.01); *H04L 63/0428* (2013.01); *H04L 63/08* (2013.01)

(58) Field of Classification Search
CPC . H04L 63/08; H04L 63/0428; G06F 21/6218; G06F 21/6209
USPC ................................ 726/22, 4; 713/165, 168
See application file for complete search history.

(56) References Cited

U.S. PATENT DOCUMENTS

| | | | |
|---|---|---|---|
| 7,571,325 B1* | 8/2009 | Cooley et al. | 713/181 |
| 2006/0265493 A1* | 11/2006 | Brindley et al. | 709/224 |
| 2007/0226062 A1* | 9/2007 | Hughes et al. | 705/14 |
| 2010/0082725 A1* | 4/2010 | Onishi | 709/201 |

OTHER PUBLICATIONS

Sitaram Iyer, et al, "Squirrel: A Decentralized Peer-to-Peer Web Cache," *Proceedings of the Twenty-first Annual Symposium on Principles of Distributed Computing*, pp. 213-222 (2002).

Ricardo Baeza-Yates, et al, "Crawling the Infinite Web: Five Levels are Enough." *Algorithms and Models for the Web-Graph*, pp. 156-167 (2004).

Emad Abd-Elrahman, et al, "Video Streaming Security: Window-Based Hash Chain Signature Combines with Redundancy Code-YouTube Scenario as an Internet Case Study," *Multimedia (ISM), 2010 IEEE International Symposium on*, pp. 33-40 (2010).

(Continued)

*Primary Examiner* — Aravind Moorthy
(74) *Attorney, Agent, or Firm* — John C. Pokotylo; Straub & Pokotylo

(57) ABSTRACT

A security system and service, which improves the performance of SECaaS services, is described. A security server system tracks the content that has successfully passed through its security modules and distributes this information to the end user client devices as hashlist information. The remote client devices can then safely bypass the cloud for a significant fraction of Web object requests by using information on a locally stored hashlist to validate Web objects.

22 Claims, 11 Drawing Sheets

(56) References Cited

OTHER PUBLICATIONS

Gwenael Doerr, et al, "A Guide Tour of Video Watermarking," *Signal Processing: Image Communication*, vol. 18, Issue 4, pp. 263-282 (Apr. 30, 2003).

Chirag Sheth et al, "Performance Evaluation and Comparative Analysis of Network Firewalls" *IEEE Devices and Communications (ICDeCom), 2011 International Conference on*, pp. 1-5 (2011).

Zhichun Li, et al, "WebShield: Enabling Various Web Defense Techniques without Client Side Modifications," *NDSS* (2011) (18 pgs.).

Alexander Moshchuk, et al, "SpyProxy: Execution-based Detection of Malicious Web Content," *SS'07 Proceedings of 16th USENIX Security Symposium on USENIX Security Symposium*, Article No. 3 (Aug. 6, 2007) (16 pgs.).

Jon Oberheide, et al. "Rethinking Antivirus: Executable Analysis in the Network Cloud," *HotSec* (2007) (5 pgs.).

Jon Oberheide, et al, "Virtualized In-Cloud Security Services for Mobile Devices," *Proceedings of the First Workshop on Virtualization in Mobile Computing*, pp. 31-35 (2008) (5 pgs.).

Albert Greenberg, et al, "The Cost of a Cloud: Research Problems in Data Center Networks," *ACM SIGCOMM Computer Communication Review*, vol. 39, Issue 1, pp. 68-73 (Dec. 31, 2008).

Ashish Vulimiri, et al, "More is Less: Reducing Latency via Redundancy," *Proceedings of the 11th ACM Workshop on Hot Topics in Networks*, pp. 13-18 (2012).

Venugopalan Ramasubramanian, et al, "Perils of Transitive Trust in the Domain Name System," *USENIX Association, Proceedings of the 5th ACM SIGCOMM conference on Internet Measurement*, pp. 379-384 (2005).

Chao Zhang, et al, "Inflight Modifications of Content: Who are the Culprits," *Workshop of Large-Scale Exploits and Emerging Threats (LEET'11)* (2011) (8 pgs.).

Cloud Security Alliance, "Security as a Service," *SeCaaS, Defined Categories of Service 2011*, pp. 1-27 (2011).

Jon Oberheide, et al, "CloudAV: N-Version Antivirus in the Network Cloud," *USENIX Security Symposium*, pp. 91-106 (2008).

\* cited by examiner

PROVIDING A FAST, REMOTE SECURITY SERVICE USING HASHLISTS OF APPROVED WEB OBJECTS

§0. RELATED APPLICATION(S)

This application claims the benefit of U.S. Provisional Patent Application Ser. No. 61/698,428 (incorporated herein by reference and referred to as "the '428 provisional"), filed on Sep. 7, 2012, titled "VIRTUAL SECURE NETWORK: PROVIDING SECURITY TO REMOTE USERS WHILE MINIMIZING THE PERFORMANCE HIT" and listing Sai Teja PEDDINTI, Justin CAPPOS, Keith ROSS and Nasir MEMON as the inventors. The present invention is not limited to requirements of the particular embodiments described in the '428 provisional application.

§1. BACKGROUND OF THE INVENTION

§1.1 Field of the Invention

The present invention concerns computer and/or network security.

In particular, the present invention concerns Security as a Service ("SECaaS").

§1.2 Background Information

End user devices are frequently targets of malware, which allow an attacker to gain access to the user's device, stealing the user's private information or taking control of the device as part of a botnet. As end user devices are increasingly gateways for financial services (e.g., GOOGLE WALLET™ (See, e.g., "Google wallet," at google.com/wallet/how-it-works-security.html (incorporated herein by reference).), CHASE QUICK DEPOSIT™ (See, e.g., "Chase quick deposit: Deposit checks with your ipad, iphone, android or blackberry smartphone," at chase.com/online/services/check-deposit.htm (incorporated herein by reference).), etc.), maintaining personal data (e.g., INSTAGRAM™ (See, e.g., "Instagram: Fast beautiful photo sharing," at instagr.am/ (incorporated herein by reference).), iCalendar (See, e.g., "Calendar on iphone," at apple.com/iphone/built-in-apps/calendar.html (incorporated herein by reference).), etc.), and authentication (e.g., Viper Smart Start™ (See, e.g., "Viper smart start: Start, control or locate your car from virtually anywhere with your smartphone," at viper.com/smartstart/ (incorporated herein by reference).), GOOGLE AUTHENTICATOR™ (See, e.g., "Google authenticator," at play.google.com/store/apps/details?id=com.google.android.apps.authenticator2 (incorporated herein by reference).), etc.), it is critical that these end user devices be secured.

User devices are generally protected by, at most, one antivirus application or utility running on the device. However, a considerable amount of malware is undetected with any single modern antivirus system, as the best detection rates are reportedly ~78%. (See, e.g., the reference J. Oberheide, E. Cooke, and F. Jahanian, "CloudAV: N-Version Antivirus in the Network Cloud," *Proceedings of the 17th conference on Security symposium*, pp. 91-106 (Berkeley, Calif., USA: USENIX Association, 2008) Available online at dl.acm.org/citation.cfm?id=1496711.1496718 (incorporated herein by reference).) Although it has been reported that simultaneously using multiple independent antivirus engines can boost the malware detection rates to ~98% (See, e.g., the Oberheide et al article.), thereby providing much better protection, such deployments on a single device have been shown to impact system performance and user experience negatively.

With the rising use of cloud computing, computing resources have become inexpensive and available on demand. This has led to a new paradigm of Security as a Service ("SECaaS") (See, e.g., CloudSecurityAlliance, "SecaaS Security as a Service Working Group: Defined Categories of Service 2011," Available at: cloudsecurityalliance.org/wp-content/uploads/2011/09/SecaaSV1 0.pdf (incorporated herein by reference).), offering security services remotely (from the cloud). With SECaaS, all of the user's inbound and outbound traffic passes through a security service on the cloud, which provides advanced security mechanisms including multiple intrusion detection systems, firewalls, and antivirus engines, all of which are typically managed by experts. Many companies are currently providing SECaaS services for devices in enterprise networks (See, e.g., McAfee, "Cloud Security: Exploit the Cloud without Exposing Your Data," at: mcafee.com/us/solutions/cloud-security/cloud-security.aspx (incorporated herein by reference), and Symantec, "Symantec Cloud: Making the Complex Simple," at: symantec.com/theme.jsp?themeid=symantec-cloud (incorporated herein by reference).), where the enterprises simply route their traffic through a nearby SECaaS provider. Given the close proximity of the cloud security service provider to the enterprise location, such rerouting typically does not negatively impact the enterprise user experience. Also, the enterprise might amortize the costs associated with SECaaS over a large number of devices and/or over long periods.

Such SECaaS services can potentially offer enhanced security to ordinary (e.g., non-enterprise) users and remote enterprise users. Such users can route their device traffic through a SECaaS service, thereby obtaining advanced security services in addition to their on device/host protections. Relaying traffic through a secure cloud also reduces the effectiveness of many attacks by ISPs (See, e.g., C. Zhang, C. Huang, K. Ross, D. Maltz, and J. Li, "Inflight Modifications of Content: Who are the Culprits?" *Workshop of Large-Scale Exploits and Emerging Threats* (LEET '11) 2011 (incorporated herein by reference).), and K. Bode, "ISPs Injecting their Content into Websites: Rogers Tests New Cap Warning System, Raises Neutrality Alarms" at dslreports.com/shownews/90134 (incorporated herein by reference).), rogue access points (See, e.g., P. Moceri and T. Ruths, "Cafe Cracks: Attacks on Unsecured Wireless Networks," at cse.wustl.edu/_jain/cse571-07/ftp/cafecrack/index.html (incorporated herein by reference).), and other malicious parties (DNS hijacking (See, e.g., V. Ramasubramanian and E. G. Sirer, "Perils of Transitive Trust in the Domain Name System," *Proceedings of the 5th ACM SIGCOMM conference on Internet Measurement*. pp. 35-35 (ser. IMC '05 Berkeley, Calif., USA: USENIX Association, 2005), [Online] Available at: dl.acm.org/citation.cfm?id=1251086.1251121 (incorporated herein by reference).). However, there are challenges to providing SECaaS services to ordinary users and/or remote enterprise users. More specifically, although SECaaS can provide better security, manageability, and scalability than host and enterprise security deployments, it increases Webpage load times significantly. Studies indicate that even a few hundreds of milliseconds of delay in Webpage load times can adversely effect user browsing. (See, e.g., J. Brutlag, "Speed Matters for Google Web Search," at services.google.com/fh/files/blogs/google delayexp.pdf (incorporated herein by reference), NYTimes, "For Impatient Web Users, an Eye Blink is Just Too Long to Wait," at nytimes.com/2012/03/01/technology/impatient-web-users-flee-slow-loading-sites.html?_r=0 (incorporated herein by reference), K. Eaton, "How One Second could Cost Amazon $1.6 Billion in Sales," at fastcompany.com/1825005/how-one-second-could-costamazon-16-billion-sales (incorporated herein by reference), E. Schurman and J. Brutlag, "The User and Business Impact of Server Delays, Additional Bytes, and HTTP Chunking in Web Search," at velocityconf.com/velocity2009/public/schedule/detail/8523, 2009 (incorporated herein by reference), and C. Erickson, "Americans don't have Time for Slow Websites [infographic]," at mashable.com/2012/03/14/slow-website-stats-infographic/(incorporated herein by reference).) For example, a Webpage that loads 250 milliseconds slower might cause people to switch to a competitor (Recall, e.g. NYTimes, "For Impatient Web Users, an Eye Blink is Just Too Long to Wait," at nytimes.com/2012/03/01/technology/impatient-web-users-flee-slow-loading-sites.html?_r=0.).

An increase in the web search latency of few 100 milliseconds might reduce the number of searches performed. (Recall, e.g., J. Brutlag, "Speed Matters for Google Web Search," at services.google.com/fh/files/blogs/google delayexp.pdf.) Furthermore, it has been reported that one in four Internet users abandon a page if it takes more than four seconds to load. (Recall, e.g., C. Erickson, "Americans don't Have Time for Slow Websites [infographic]," at mashable.com/2012/03/14/slow-website-stats-infographic/ (incorporated herein by reference).) Thus, the present inventors believe that user-perceived latencies pose a significant barrier for the adoption of SECaaS by ordinary end users and remote enterprise users.

As should be appreciated from the foregoing, it would be useful to provide end users with better security than a single antivirus application or utility, while avoiding latencies (such as latencies for Webpage loading) that might annoy such end users. The present inventors believe that an end user will not use the cloud security service if the latency overhead due to the cloud detour is too high. Ideally, security should be provided such that latencies are very close to those when directly requesting the content from the Internet. Also, it would be useful to the provider of the security service to reduce or minimize his or her costs. For example, large cloud providers typically do not have data centers close to all potential end users (including mobile users), to guarantee low latencies. Indeed, currently, Amazon EC2 only has three (3) data centers in the U.S. and it has been reported that even users in the continental U.S. can experience latencies of over 50 ms. (See, e.g., A. Vulimiri, O. Michel, P. B. Godfrey, and S. Shenker, "More is Less: Reducing Latency via Redundancy," Proceedings of the 11th ACM Workshop on Hot Topics in Networks. pp. 13-18 (ser. HotNets-XI. New York, N.Y., USA: ACM, 2012). [Online]. Available at: doi.acm.org/10.1145/2390231.2390234 (incorporated herein by reference).) Since a cloud data center can cost more than half a billion dollars (See, e.g., A. Greenberg, J. Hamilton, D. A. Maltz, and P. Patel, "The Cost of a Cloud: Research Problems in Data Center Networks," *SIGCOMM Comput. Commun. Rev.*, vol. 39, no. 1, pp. 68-73, December 2008. [Online]. Available at: doi.acm.org/10.1145/1496091.1496103 (incorporated herein by reference).), simply building more data centers near all end users might not be feasible.

§2. SUMMARY OF THE INVENTION

The problem of user-experienced latencies encountered when all requested Web objects by a client device(s) must pass through a security server system is solved by (1) generating, by the security server system, a list of at least one {validated Web object identifier (e.g., a hash value of a Webpage identifier such as a URL), validated Web object hash value} pair (also referred to as a type of "hashlist entry"), (2) forwarding at least a part of the list to the client device, (3) receiving, by the client device, the at least part of the list, (4) storing, by the client device, the at least part of the list received in a client list of at least one {validated Web object identifier, validated Web object hash value} pair, and (5) responsive to a request for a Web object by an application at the client device, determining, by the client device, whether or not the requested Web object is included in the client list, and responsive to a determination, by the client device, that the requested Web object is included in the client list, (a) fetching, by the client device, the requested Web object from an origin server (directly, bypassing the security server system), (b) receiving, by the client device, the Web object, (c) computing, by the client device, a hash of the received Web object, (d) comparing, by the client device, the computed hash with the hash of the requested Web object included in the client list, and (e) responsive to a determination, by the client device, that the computed hash matches the hash of the requested Web object included in the client list, passing, by the client device, the requested Web object to the application, otherwise, responsive to a determination, by the client device, that the computed hash does not match the hash of the requested Web object included in the client list, requesting, by the client device, the requested Web object via the security server system.

Responsive to a determination, by the client device, that the requested Web object is not included in the client list, the client device requests the requested Web object via the security server system, and/or requests a {validated Web object identifier, validated Web object hash value} pair from the security server system.

The secondary problem of how best to forward a generated list of at least one {validated Web object identifier, validated Web object hash value} pair to one or more clients in a way that considers both (1) a delay between the request and receipt of a Web object by an application on the client device and (2) network resources (e.g., bandwidth) used by distributing at least one {validated Web object identifier, validated Web object hash value} pair is solved by providing a hybrid push-pull hashlist distribution protocol method which includes (1) maintaining, by the security server system, both (i) a pull hashlist including hashes for Web objects to be provided to a client device on demand from the client device, and (ii) a push hashlist including hashes for Web objects to be provided to a client device regardless of whether or not the client device requested the Web object, and (2) responsive to a determination, by the security server system, that an expected future period cost value for one or more pulls of a {validated Web object identifier, validated Web object hash value} pair on the pull hashlist exceeds an expected future period cost value for a push of the {validated Web object identifier, validated Web object hash value} pair, adding the {validated Web object identifier, validated Web object hash value} pair to the push hashlist. The hashlist entry added to the push hashlist may be deleted from the pull hashlist.

In one example a hybrid push-pull hashlist distribution protocol, the expected future cost for one or more pulls of a {validated Web object identifier, validated Web object hash value} pair is defined as $f \times (C_{delay} + C_{bandwidth})$, where "f" is defined as an estimated number of clients that will request the Web object in the future period, "$C_{delay}$" is defined as a cost of an additional delay encountered when retrieving a hash entry on demand and "$C_{bandwidth}$" is defined as a cost of network resources used to distribute a hash entry. In another example embodiment, "$C_{delay}$" is defined as the product of (1) a tunable parameter $\alpha$ and (2) the cost of an additional delay encountered when retrieving a hash entry on demand.

In one example a hybrid push-pull hashlist distribution protocol, the expected future period cost for the push distribution of a {validated Web object identifier, validated Web object hash value} pair to one or more clients is defined as $(n-m) \times (C_{bandwidth})$, where "n" is defined as a number of clients served by the security server system, "m" is defined as a number of clients that have already requested the Web object, and "$C_{bandwidth}$" is defined as a cost of network resources used to distribute a hash entry.

In one example embodiment, the estimated number of clients that which request the Web object in the future period "f" is a linear estimator that minimizes a least square error of estimates generated from a log of actual client requests.

§3. BRIEF DESCRIPTION OF THE DRAWINGS

§4. DETAILED DESCRIPTION

Example embodiments consistent with the present invention may involve novel methods, apparatus, message formats, and/or data structures for providing robust security services in a manner that reduces end user-perceived latencies. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the example embodiments shown and the inventors regard their invention as any patentable subject matter described.

In the following, an example architecture consistent with the present invention is described in §4.1. Then, example methods consistent with the present invention are described in §4.2. Next, example apparatus and implementations consistent with the present invention are described in §4.3. Thereafter, examples of operations in an example system are described in §4.4. Then, example hashlist distribution protocols are described in §4.5. Refinements, alternatives and extensions of the example embodiments are then described in §4.6. Finally, some conclusions are presented in §4.7.

In the following, a "Web object" may include, for example, a Webpage (e.g., an HTML page with Javascript), a CSS sheet, an image, a Javascript file, an audio file, a video file, a text file, an application file, etc. In this application, "Web object", can be replaced, as appropriate, with "URL", "Webpage", "hash of URL", "hash of Web object identifier", "hash of Web object", etc. Further, as should be apparent to those of ordinary skill in the art, in some instances, "Web object" is intended to mean an "identifier of a Web object" (e.g., the URL of a Webpage). For example, "{validated Web object identifier, validated Web object hash value} pair" may be shortened to read "{validated Web object, hash value} pair."

§4.1 EXAMPLE ARCHITECTURE

Figure 1:
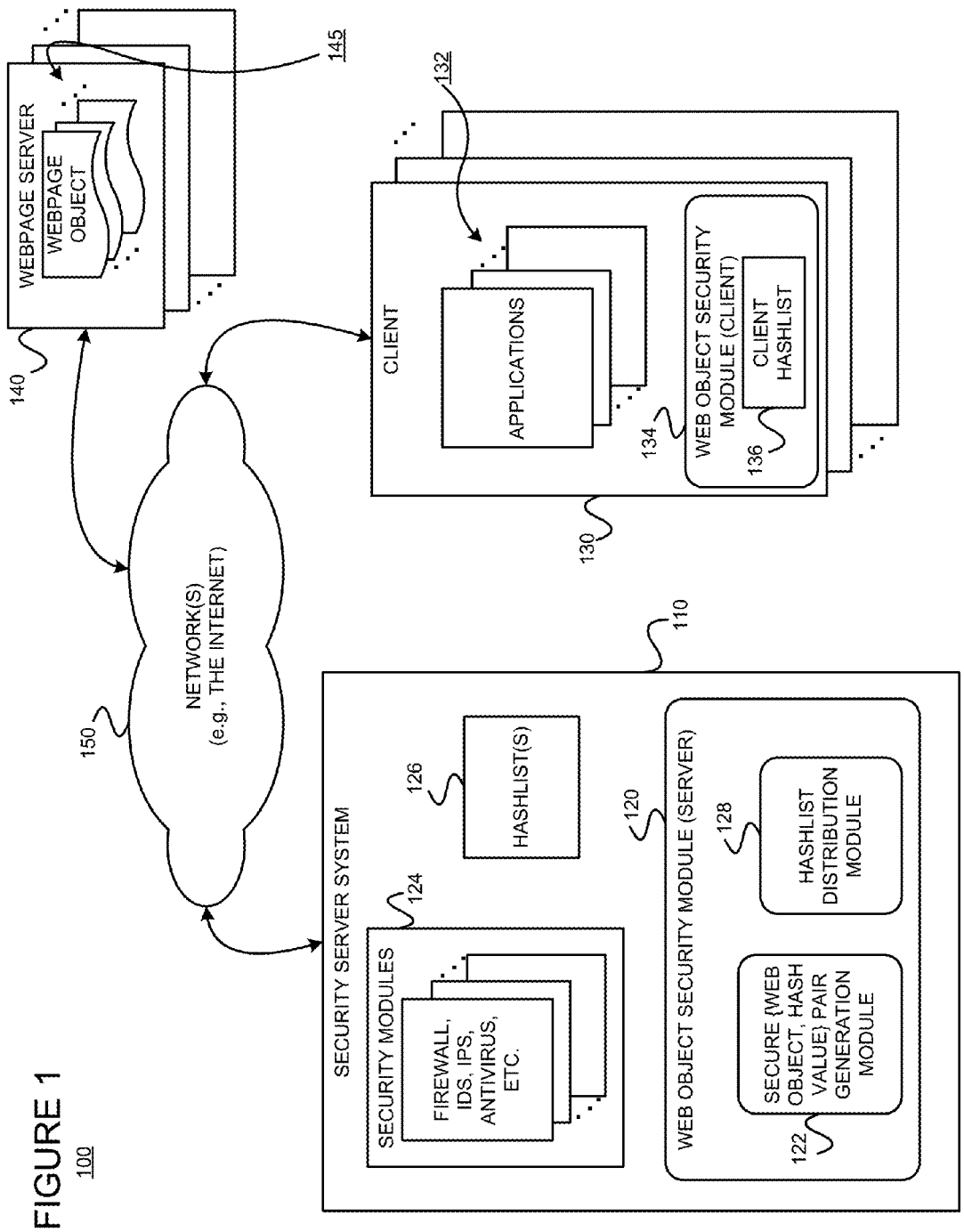
FIG. 1 is a block diagram of an example environment in which an example system, consistent with the present invention, may operate.

FIG. 1 is a block diagram of an example environment 100 in which an example system, consistent with the present invention, may operate. The example environment 100 includes a security server system 110, at least one client device 130, and at least one Webpage (or more generally, Web object) server 140. These components may communicate with each other via one or more networks 150, such as the Internet for example. The example security server system 110 may include, for example, a web object security module (server) 120, one or more security modules (e.g., firewalls, intrusion detection systems (IDSs), antivirus modules, etc.) 124 and a hashlist 126. A secure {Web object, hash value} pair generation module 122 provides {Web object identifier, Web object hash value} pairs for Web objects that have passed one or more security tests by the security modules 124. These {Web object, hash value} pairs are stored as one or more hashlists 126. The hashlist distribution module 128 is responsible for forwarding (or distributing) at least a portion of the one or more hashlists 126 to one or more clients 130. The security provided by the example security server system 110 depends on the deployed security modules 124 and therefore has the same limitations of traditional signature based antivirus or intrusion detection systems ("IDS"). Since, however, multiple security modules 124 may be deployed (e.g., multiple antivirus, IDS, etc., from different vendors) in the cloud, the security provided should be robust. (See, e.g., the reference J. Oberheide, E. Cooke, and F. Jahanian, "CloudAV: N-Version Antivirus in the Network Cloud," *Proceedings of the* 17*th conference on Security symposium*, pp. 91-106 (Berkeley, Calif., USA: USENIX Association, 2008) Available online at dl.acm.org/citation.cfm?id=1496711.1496718 (incorporated herein by reference).)

Each of the one or more example clients 130 may include, for example, one or more applications 132, a web object security module (client) 134 and a client hashlist 136. The applications 132 (e.g., an Internet browser) may request Web objects 145 from one or more Webpage (or more generally, Web object) servers 140. As will be described in more detail below, the Web object security module (client) 134 may use the client hashlist 136 to determine whether or not a requested Web object has been validated as secure by the security server system 110. If the Web object security module (client) 134 determines that both (1) a requested Web object has been validated as secure by the security server system 110 and (2) a hash of the Web object matches a corresponding hash of the Web object on the client hashlist 136, it may then pass that Web object to the appropriate application 132. If on the other hand, the Web object security module (client) 134 determines that a requested Web object has not been validated as secure by the security server system 110, it may then request the Web object via the security server system 110 (or may request an appropriate {validated Web object, hash value} pair from the security server system 110, or may request that the security server system 110 validate the security of the Web object).

§4.2 EXAMPLE METHODS

Figure 2:
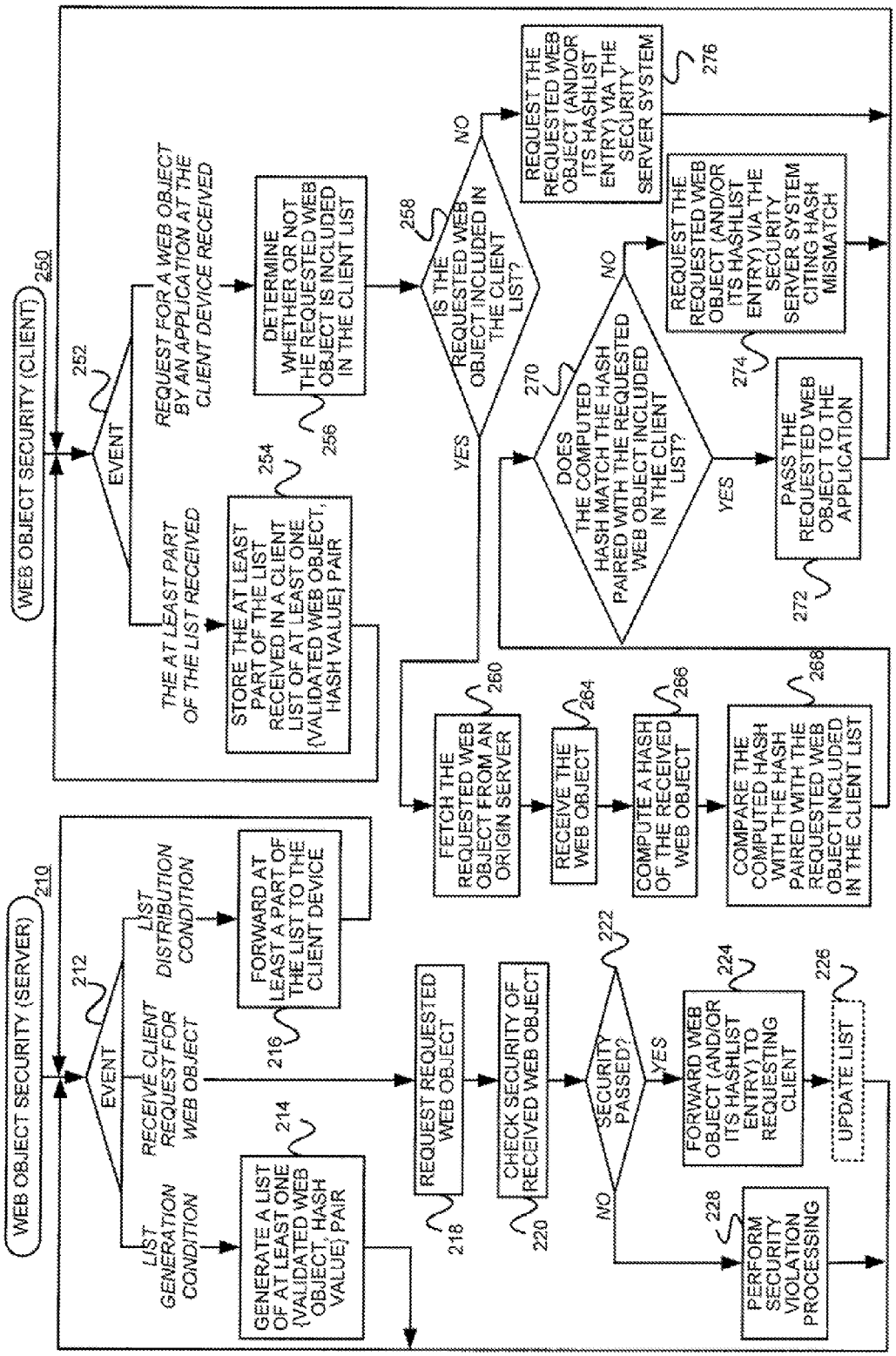
FIG. 2 is a flow diagram illustrating operations of an example Web object security (server) method and an example Web object security (client) method, consistent with the present invention.

FIG. 2 is a flow diagram illustrating operations of an example Web object security (server) method 210 and an example Web object security (client) method 250, consistent with the present invention. Various branches of the example method 210 are performed responsive to the occurrence of certain events 212. For example, responsive to the occurrence of a list generation condition being met, the method 210 may generate a list of at least one {validated Web object, hash value} pair. (Block 214) Responsive to the occurrence of a list distribution condition being met, the method 210 may forward at least a part of the list to at least one client device. (Block 216) (Acts performed by the method 210 responsive to receiving a client request for a Web object are described later.)

Various branches of the example method 250 are performed responsive to the occurrence of certain events 252. For example, responsive to receiving at least a part of the list (from the server) (Recall block 216), the method 250 stores the at least part of the list received in a client list (including at least one {validated Web object, hash value} pair). (Block 254) Responsive to a request for a Web object by an application at the client device, the method 250 determines, whether or not the requested Web object is included in the client list. (Block 256) If the method 250 determines that the requested Web object is included in the client list (YES branch of 258), the method 250 fetches the requested Web object from an origin server (e.g., directly, bypassing the security server system) (Block 260), receives the Web object (Block 264), computes a hash of the received Web object (Block 266) and compares the computed hash with the hash of the requested Web object included in the client list (Block 268). If the method 250 determines that the computed hash matches the hash of the requested Web object included in the client list (YES branch of 270), it passes the requested Web object to the application (because it has been validated as being secure). (Block 272) If, on the other hand, the method 250 determines that the computed hash does not match the hash of the requested Web object included in the client list (NO branch of 270), it may request the requested Web object via the security server system citing a hash mismatch (or it may quarantine and/or perform security procedures such as alerting the user to a possible security violation). (Block 274) Referring back to 258, if it is determined that the requested Web object is not included in the client list, the method 250 may request a {validated Web object, hash value} pair from the security server system, and/or request the requested Web object via the security server system. (Block 276)

§4.3 EXAMPLE APPARATUS AND IMPLEMENTATION

Figure 3:
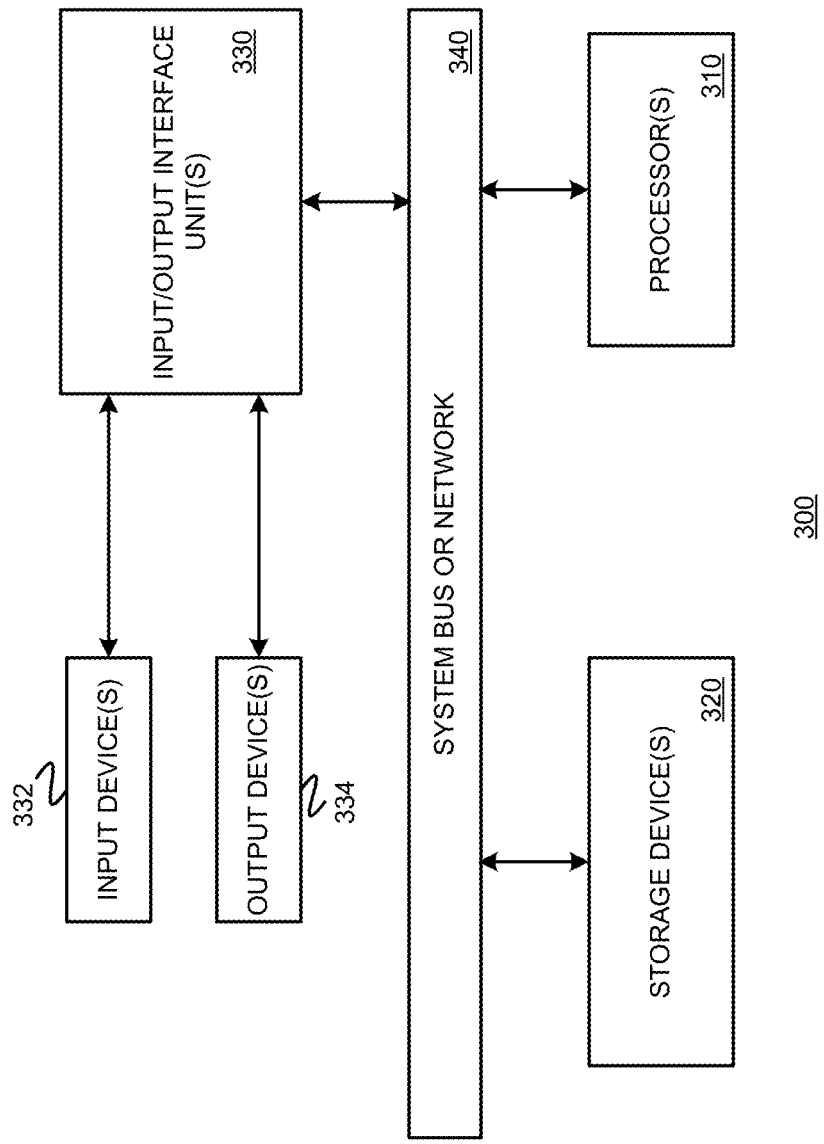
FIG. 3 is a block diagram of exemplary apparatus that may be used to perform operations of various components in a manner consistent with the present invention and/or to store information in a manner consistent with the present invention.

FIG. 3 is a block diagram of exemplary apparatus 300 that may be used to perform operations of various components or modules in a manner consistent with the present invention and/or to store information in a manner consistent with the present invention. The apparatus 300 includes one or more processors 310, one or more input/output interface units 330, one or more storage devices 320, and one or more system buses and/or networks 340 for facilitating the communication of information among the coupled elements. One or more input devices 332 and one or more output devices 334 may be coupled with the one or more input/output interfaces 330.

The one or more processors 310 may execute machine-executable instructions (e.g., C++, Java, etc.) to perform one or more aspects of the present invention. For example, one or more software modules (or components), when executed by a processor, may be used to perform the methods described herein. At least a portion of the machine executable instructions may be stored (temporarily or more permanently) on the one or more storage devices 320 and/or may be received from an external source via one or more input interface units 330.

In one embodiment, the machine 300 may be one or more servers and implement the security server system 110 of FIG. 1. The machine 300 may be one or more client devices such as that 130 of FIG. 1. In these cases, the processing units 310 may be one or more microprocessors. The bus 340 may include a system bus. The storage devices 320 may include system memory, such as read only memory (ROM) and/or random access memory (RAM). The storage devices 320 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, and/or solid state memory.

A user may enter commands and information into the device 300 through input devices 332. Such input devices are often connected to the processing unit(s) 310 through an appropriate interface 330 coupled to the system bus 340. The output devices 334 may include a monitor or other type of display device, which may also be connected to the system bus 340 via an appropriate interface. In addition to (or instead of) the monitor, the personal computer may include other (peripheral) output devices (not shown), such as speakers for example.

The operations of components or modules, such as those described above, may be performed on one or more computers. Such computers may communicate with each other via one or more networks, such as the Internet for example.

Alternatively, or in addition, the various modules, operations, and/or acts described above may be implemented in hardware (e.g., integrated circuits, application specific integrated circuits ("ASICs"), field programmable gate or logic arrays ("FPGAs"), etc.).

An example security server system 110 (referred to as a "Turbo-SECaaS server") is written in Java, handles HTTP Web content and includes a multi-threaded Web proxy server at its core. The example Turbo-SECaaS server listens for HTTP requests on a TCP port, and maintains a hash entry for every web object URL it sees. It uses an embedded Apache Derby (See, e.g., "Apache Derby," at db.apache.org/derby/ (incorporated herein by reference).) database for storing the hash entries. Each entry in the server hashlist corresponds to a URL and includes the SHA-1 hash of the URL and the SHA-1 hash of the object. Thus the size of a hash entry is 40 bytes—20 bytes for the SHA1 hash of the URL and 20 bytes for the SHA1 hash of the URL content. The example Turbo-SECaaS server also pushes the hash entries to the Turbo- SECaaS clients and receives periodic keep-alive messages from clients. These periodic updates inform the server when a client is offline.

Referring to security modules 124 of FIG. 1, several security services can be integrated with the example Turbo-SECaaS server. Two options in designing how the web proxy and off-the-shelf security services (like antivirus software) communicate are described. The first option is to setup the antivirus software as a parent proxy to the web proxy, inspecting each object before passing it to the web proxy. HTTP AntiVirus Proxy (HAVP) (See, e.g., "HTTP AntiVirus Proxy (HAVP)," at server-side.de/ (incorporated herein by reference).) (public-domain proxy antivirus software), permits such parent proxy configurations. The second option is to set up an antivirus application as a service (on the same or a different physical machine) of the proxy, and have the service interact with the proxy using the Internet Content Adaption Protocol ("ICAP"). In this setup, each object reaches the web proxy and is then sent to the content adapters or redirectors to add their adaptations to the web objects before passing them to the users. Antivirus content adapters (like SquidClamav (See, e.g., "SquidClamav: Clamav ICAP Service and Redirector for Squid," at squidclamav.darold.net/ (incorporated herein by reference).) for the Squid Proxy server) check the web objects for malware and remove the objects before the proxy passes it to the users. Recently, these content adapters have been developed as a software interface on the same physical machine as the proxy, using system calls instead of network calls to remove the network overhead and improve the performance. (See, e.g., "eCAP: the Code in the Middle," at e-cap.org/Home (incorporated herein by reference).) The example Turbo-SECaaS server uses the parent proxy setup of HAVP (See, e.g., "HTTP AntiVirus Proxy (HAVP)," at server-side.de/ (incorporated herein by reference).) to benefit from other advantages it offers (discussed below).

The security service's configurations are factors in determining the performance of the entire system and its usability. The security services deliver safe Web objects to the user devices. However, waiting for the entire Web object to be downloaded before performing a scan can lead to unacceptably large user-perceived delays. HAVP improves the delay performance by releasing all file chunks to the user device except the Web object's last chunk. Only after the complete object is determined to be safe, is the last chunk released to the user. Such an approach provides low user-perceived delays.

Another important configuration decision concerns video and audio streaming services. Although there have been many vulnerabilities reported with streaming video players (See, e.g., "Secunia Advisory SA48623: Adobe Flash Player/AIR Two Vulnerabilities," at secunia.com/advisories/44590/ (incorporated herein by reference).), security breaches just from the video streams themselves are reportedly rare, if not nonexistent (See, e.g., G. Doerr and J.-L. Dugelay, "A Guide Tour of Video Watermarking," *Signal Processing: Image Communication*. Vol. 18, no. 4, pp. 263-282 (2003, special Issue on Technologies for Image Security). [Online]. Available at: sciencedirect.com/science/article/pii/S0923596502001443 (incorporated herein by reference), and E. Abd-Elrahman, M. Abid, and H. Afifi, "Video Streaming Security: Window-based Hash Chain Signature Combines with Redundancy Code—Youtube Scenario as an Internet Case Study," 2010 IEEE *International Symposium on Multimedia (ISM)*. pp. 33-40 (December 2010) (incorporated herein by reference).). Furthermore, for efficient performance, most streaming antiviruses such as HAVP (See, e.g., "HTTP AntiVirus Proxy (HAVP)," at server-side.de/ (incorporated herein by reference).) recommend skipping the scanning of audio and video MIME file types, such as video/* or audio/*. Even if the video or audio streams are to be scanned, a size limit is generally imposed on the number of bytes scanned from the beginning. (See, e.g., "HTTP AntiVirus Proxy (HAVP)," at server-side.de/ (incorporated herein by reference).) Consequently, the example Turbo-SECaaS may be configured to skip scanning video streams. To prevent malicious data from faking the MIME type to bypass scanning, video watermarking schemes (See, e.g., G. Doerr and J.-L. Dugelay, "A Guide Tour of Video Watermarking," *Signal Processing: Image Communication*. Vol. 18, no. 4, pp. 263-282 (2003, special Issue on Technologies for Image Security). [Online]. Available at: sciencedirect.com/science/article/pii/S0923596502001443 (incorporated herein by reference), and E. Abd-Elrahman, M. Abid, and H. Afifi, "Video Streaming Security: Window-based Hash Chain Signature Combines with Redundancy Code—Youtube Scenario as an Internet Case Study," 2010 IEEE *International Symposium on Multimedia (ISM)*. pp. 33-40 (December 2010) (incorporated herein by reference).) may be used. In the worst case, a chunk based hashing scheme can be adopted for hashing video streams.

Referring back to element 134 of FIG. 1, an example web object security module (client) (referred to as "Turbo-SECaaS client") has been implemented in Java, and is responsible for managing the client hashlists (Recall, e.g., element 136 of FIG. 1.) stored on the client device 130. The example Turbo-SECaaS client uses the Apache Derby Embedded database for storing the client hashlists. Similar to the Server hashlist, each entry in the client hashlist corresponds to a URL and includes the SHA-1 hash of the URL and the SHA-1 hash of the object.

The example Turbo-SECaaS client software is provided as a standalone proxy server. The browser (e.g., the application 132 of FIG. 1) on the local client device is configured to retrieve Web objects using the local Turbo-SECaaS client proxy. This simplifies the example Turbo-SECaaS client software, and keeps it independent of different browser implementations, especially for mobile devices. The example Turbo-SECaaS client is also responsible for receiving hash entries pushed by the server, as well as updating the client hashlist. Apart from installing the Turbo-SECaaS client software and configuring the browser to use the local proxy, the end user need not take any additional steps.

§4.4 EXAMPLES OF OPERATIONS IN AN EXAMPLE SYSTEM

Referring back to FIG. 1, there are two (2) main components in the environment 100; namely, (1) a security server system 110 running a Web object security module (server) 120, and (2) one or more client devices 130 running a Web object security module (client) 134. Referring now to the example architecture 400 of FIG. 4, the Turbo-SECaaS server system 110' may be deployed in the cloud and testifies to the validity of Web objects. The Turbo-SECaaS client software 134' is installed on the user client devices 130' and decides how to direct requests based upon information from the Turbo-SECaaS server system 110'. The hash distribution protocol 128' is used by the Turbo-SECaaS server system 110' to distribute {URL, secure hash} pairs of verified Web objects (from the server hashlist 126') to the client software 134' on users' client devices 130'.

Much like an HTTP proxy server, a Turbo-SECaaS server 120' receives requests for Web objects. However, instead of offloading Web servers, by distributing hashlist information, the Turbo-SECaaS server 120' enables client devices 130' to securely retrieve content directly from origin servers. As such, a Turbo-SECaaS server 120' does not need to store any objects at all. Indeed, in one example implementation, it only stores the hashes of objects, and distributes the hashes to the clients. (However, caching content on the Turbo-SECaaS server 120' may make revocation more efficient.) Client devices 130' will then send many of their requests directly to the origin server (not shown) without passing through the cloud.

One example Turbo-SECaaS server architecture is modular in nature, so that different security boxes 124' can be used based on need. Content reaching the Turbo-SECaaS server 120' has passed a variety of security services in the cloud, such as antivirus scanners, firewalls, Intrusion Detection Systems ("IDS"), Intrusion Prevention Systems ("IPS"), and domain blacklisting services. Only content deemed safe by all the deployed security services 124' reaches the Turbo-SECaaS server 120'. Since the security boxes needn't be modified, this allows the use of a broad range of existing security technologies. (See, e.g., the reference J. Oberheide, E. Cooke, and F. Jahanian, "CloudAV: N-Version Antivirus in the Network Cloud," *Proceedings of the 17th conference on Security symposium*, pp. 91-106 (Berkeley, Calif., USA: USENIX Association, 2008) Available online at dl.acm.org/citation.cfm?id=1496711.1496718 (incorporated herein by reference), J. Oberheide, K. Veeraraghavan, E. Cooke, J. Flinn, and F. Jahanian, "Virtualized In-cloud Security Services for Mobile Devices," *Proceedings of the First Workshop on Virtualization in Mobile Computing*. pp. 31-35 (ser. MobiVirt '08. New York, N.Y., USA: ACM, 2008), [Online]. Available at: doi.acm.org/10.1145/1622103.1629656 (incorporated herein by reference), J. Oberheide, E. Cooke, and F. Jahanian, "Rethinking Antivirus: Executable Analysis in the Network Cloud," *Proceedings of the 2nd USENIX Workshop on Hot Topics in Security*. pp. 5:1-5:5 (Berkeley, Calif., USA: USENIX Association, 2007), [Online]. Available at: dl.acm.org/citation.cfm?id=1361419.1361424 (incorporated herein by reference), A. Moshchuk, T. Bragin, D. Deville, S. D. Gribble, and H. M. Levy, "SpyProxy: Execution-based Detection of Malicious Web Content," *Proceedings of 16th USENIX Security Symposium on USENIX Security Symposium*. pp. 3:1-3:16 (Berkeley, Calif., USA: USENIX Association, 2007), [Online]. Available at: dl.acm.org/citation.cfm?id=1362903.1362906 (incorporated herein by reference), Z. Li, Y. Tang, Y. Cao, V. Rastogi, Y. Chen, B. Liu, and C. Sbisa, "WebShield: Enabling Various Web Defense Techniques without Client Side Modifications," *Proceedings of the Network and Distributed System Security Symposium*. (NDSS 2011, San Diego, Calif., USA, 6 Feb.-9 Feb. 2011. The Internet Society, 2011) (incorporated herein by reference), and "Google Safe Browsing API," at code.google.com/apis/safebrowsing/ (incorporated herein by reference).)

Figure 4:
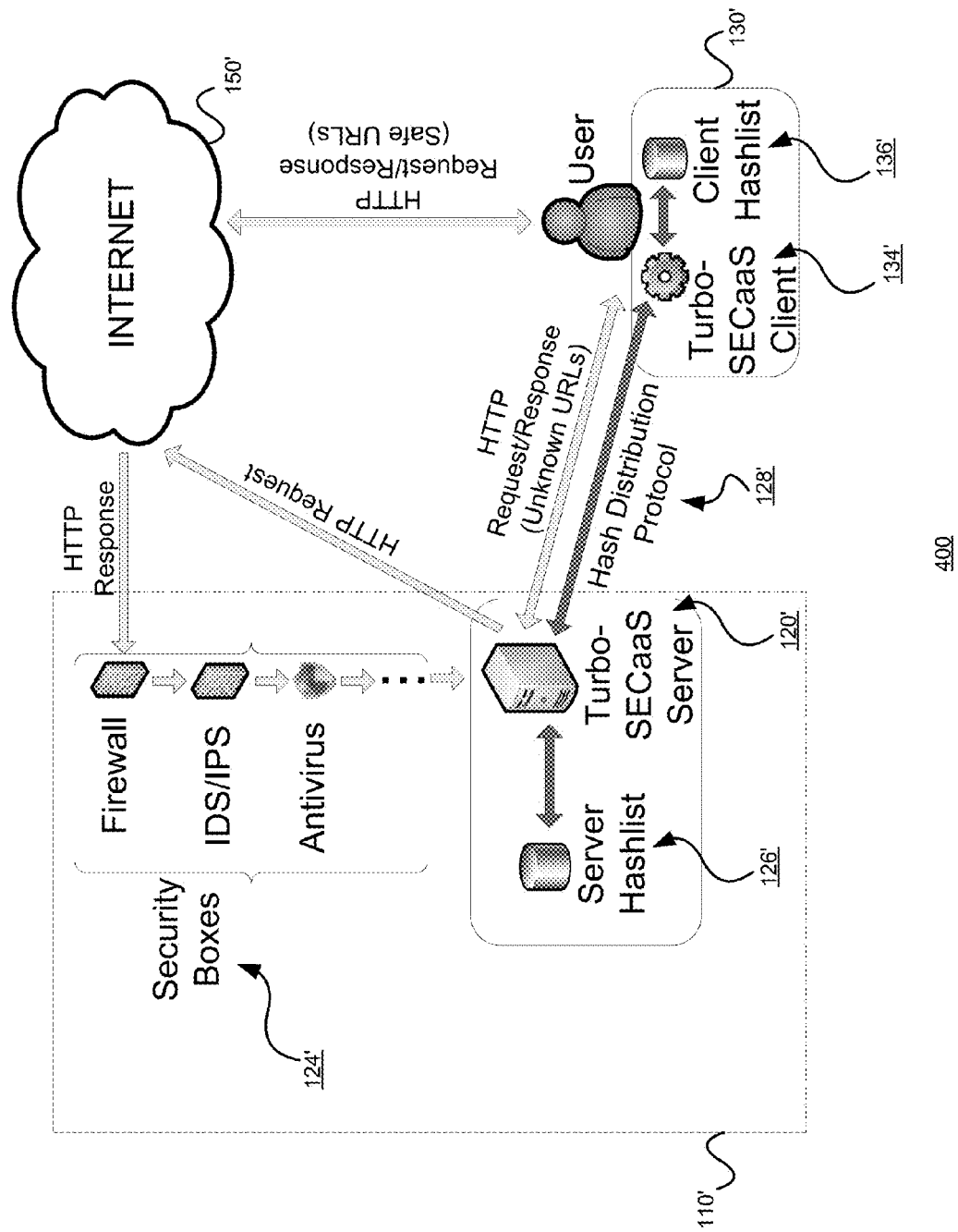
FIG. 4 is a diagram of an example environment used to illustrate certain features consistent with the present invention.

In the example implementation 400 of FIG. 4, the Turbo-SECaaS server system 110' (1) maintains a hashlist 126' for objects that have safely passed through the secure defenses 124', and (2) distributes the hashlist 126' (or at least a portion thereof) to the client devices 130' of subscribed users. Each entry in the server hashlist 126' is a tuple of the form <Secure hash of the object's referencing URL, Secure hash of the object's content>. The Turbo-SECaaS server system 110' distributes the {URL hash, Content hash} tuples (more generally referred to as {validated Web object, hash value}) in the hashlist 126' to the client devices 130' using a hashlist distribution protocol 128'. The hashlists at the server and client are called the server hashlist 126' and client hashlist 136', respectively. For ease of description, this section assumes that the client hashlists 136' are complete and automatically updated. (Section 4.5 below describes different hashlist distribution methods, and situations in which the client and server hashlists can be different.)

Recall from FIG. 2 that when a client application 132 makes a request for a Web object, the Web object security (client) method 250 checks the client hashlist. (Recall, e.g., 258 of FIG. 2.) Several possible outcomes are now described with reference to FIGS. 2 and 5A-5C.

Figure 5A:
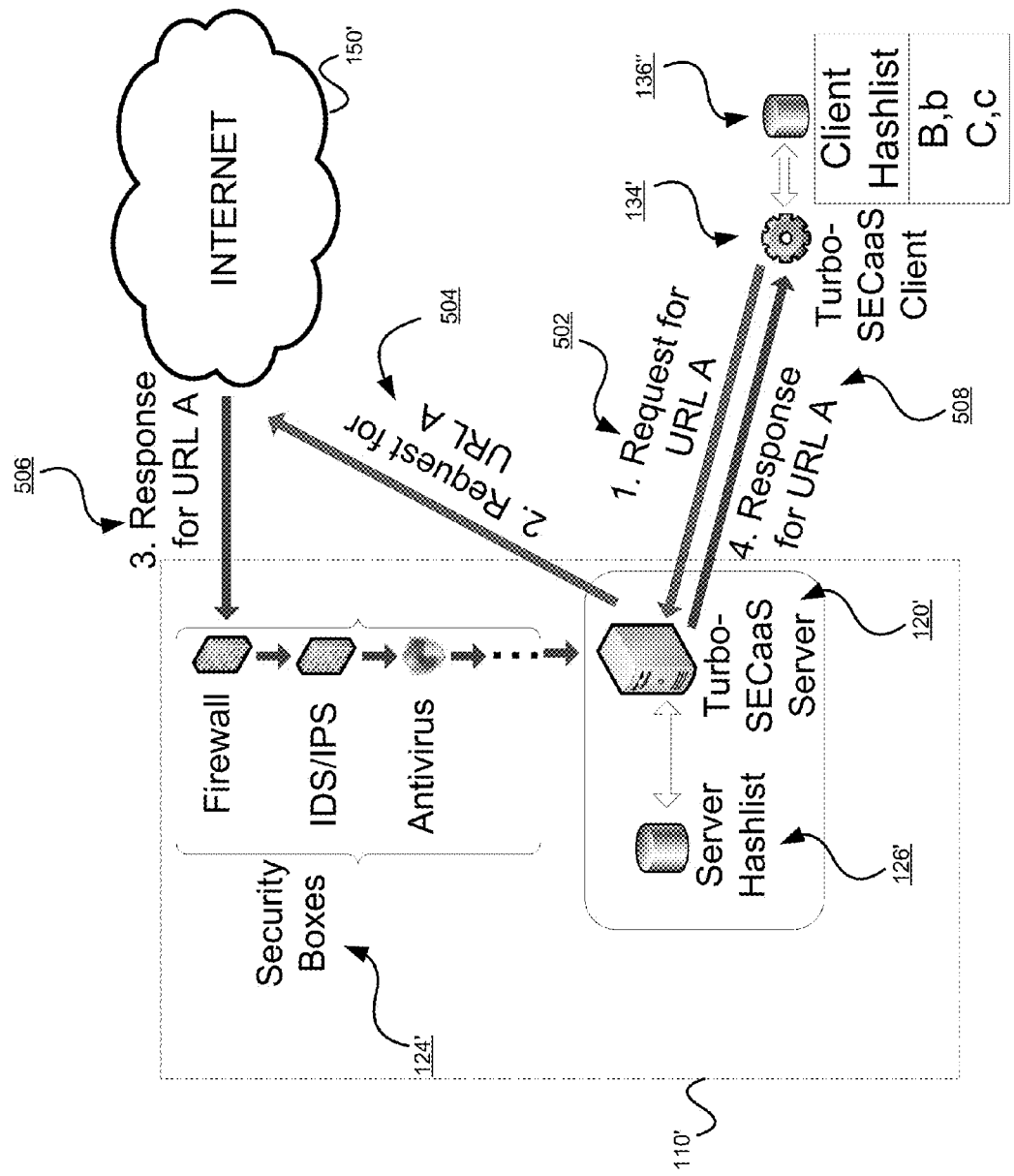
FIGS. 5A-5C are diagrams showing messaging by the system of FIG. 4 in different scenarios.

Referring to FIGS. 2 and 5A, if a requested URL (URL A) is not present in the client hashlist 136'' (Recall, e.g., NO branch of 258), the Turbo-SECaaS client 134' on the user's client device forwards the request 502 to the proxy in the Turbo-SECaaS server 110', which forwards the request 504 to the origin server (in the Internet 150, not specifically, shown). (Recall, 275 and 218 of FIG. 2.) The response 506 returned by the origin server passes through all the security services 124' before reaching the proxy 120'. (Recall, e.g., 220 and 222 of FIG. 2.) The proxy server processes the response, including creating a hash entry for the object (Recall, e.g., 226 of FIG. 2.), and then sends 508 the Web object (and/or a {URL hash, content hash} pair for the Web object) to the client device.

Figure 5B:
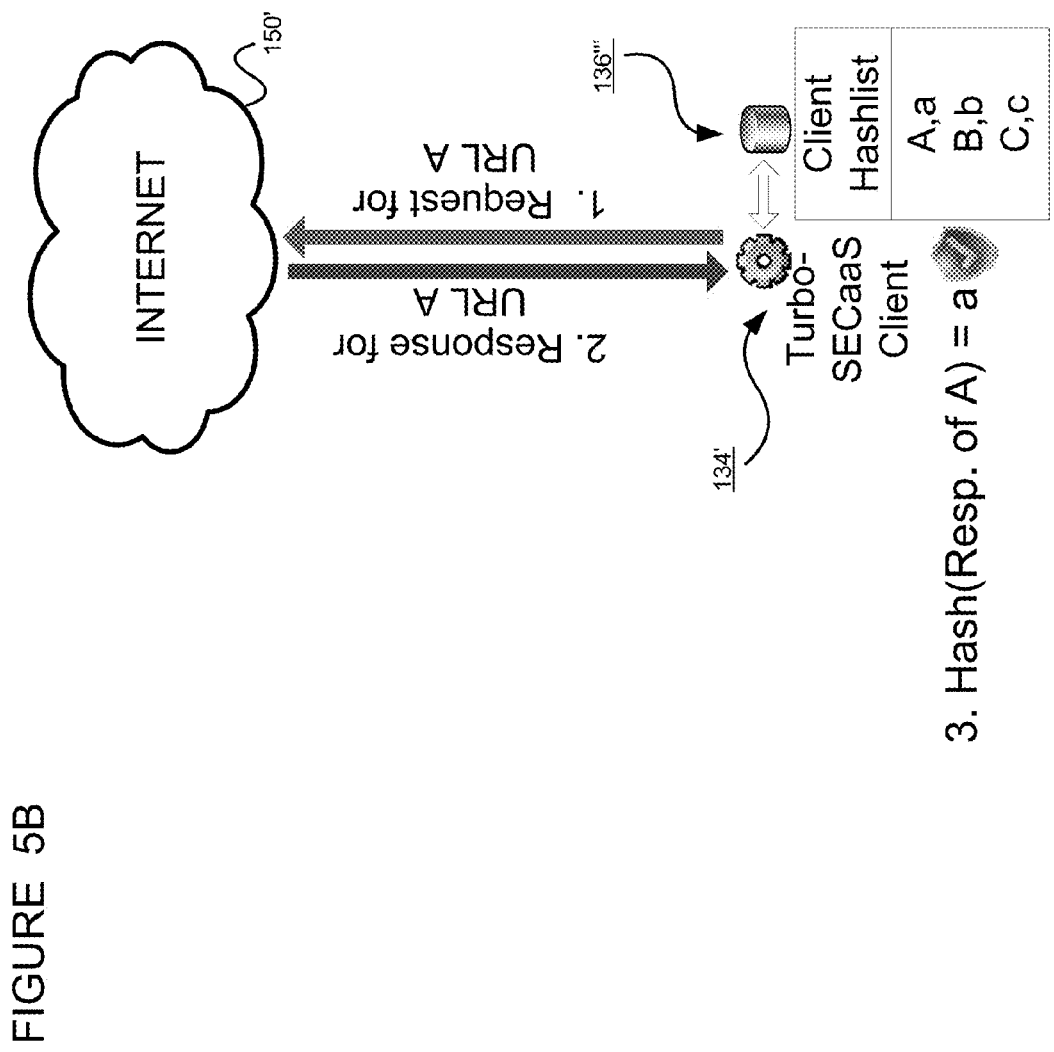
Figure 5C:
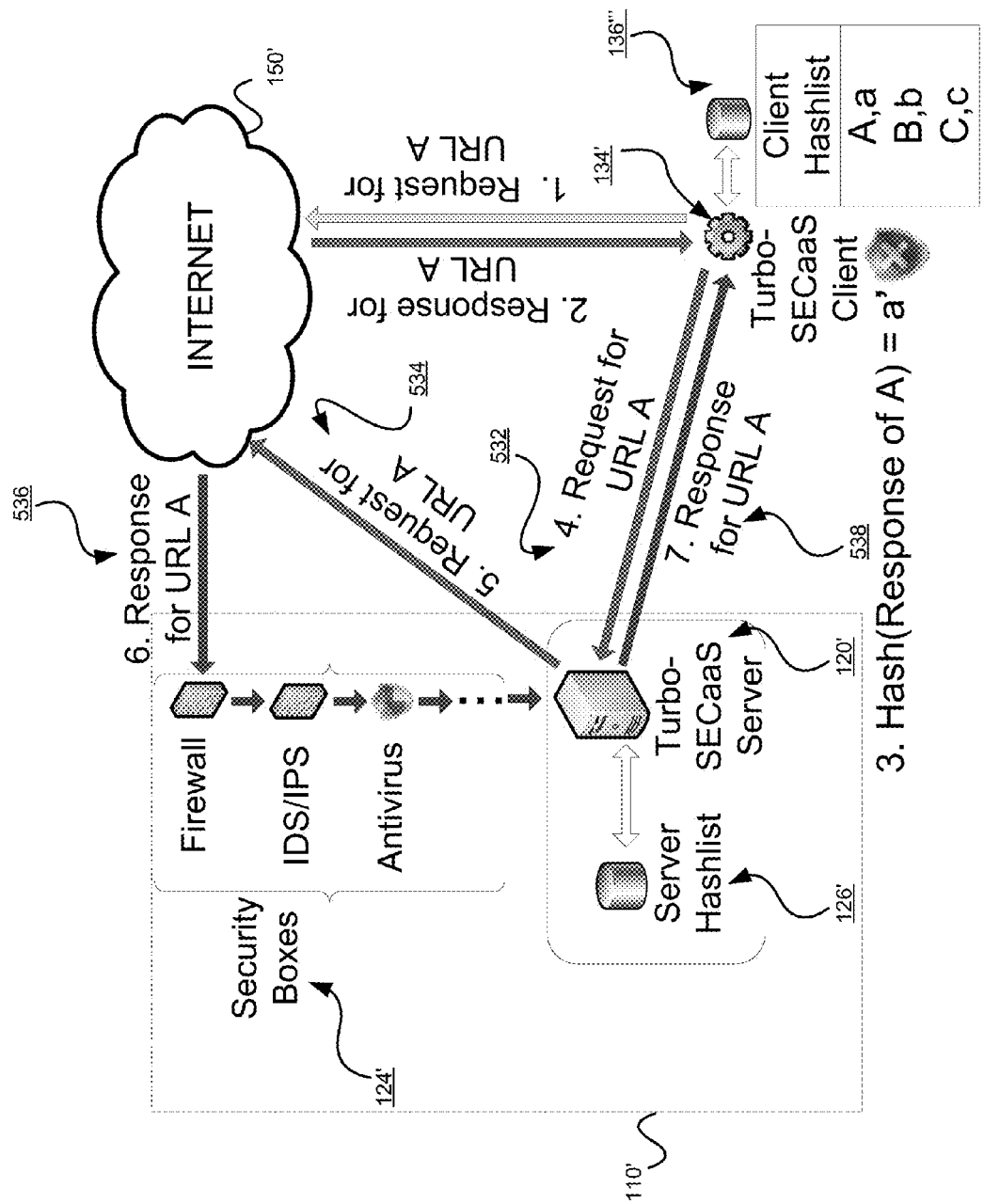

Referring to FIGS. 2, 5B and 5C, if a requested URL (URL A) is present in the client hashlist 136''' (Recall, e.g., YES branch of 258), the client device directly fetches the Web object from the origin server. (Recall, e.g., 260 of FIG. 2.) When the object arrives, the client device computes the hash of the object and compares it with the corresponding hash value in the client hashlist 136'''. (Recall, e.g., 264, 266 and 268 of FIG. 2.) There are two possibilities, depending on the result of the comparison.

Referring first to FIG. 5B, if the computed hash matches with the hash present in the client hashlist 136''', then the retrieved object is accepted and passed to the application requesting the object. (Recall, e.g., the YES branch of 270 and 272 of FIG. 2.) On the other hand, referring to FIG. 5C, if the computed hash does not match with the hash recorded in the client hashlist (e.g., when the URL content has changed or the client device is served a different (possibly malicious) object), since the retrieved object might not be safe, the object is discarded and another request 532 is sent to the Turbo-SECaaS server 110' by the Turbo-SECaaS client software 134'. (Recall, 274 and 218 of FIG. 2.) The response 536 returned by the origin server passes through all the security services 124' before reaching the proxy 120'. (Recall, e.g., 220 and 222 of FIG. 2.) The proxy server processes the response, including creating a hash entry for the object (Recall, e.g., 226 of FIG. 2.), and then sends 538 the Web object (and/or a {URL hash, content hash} pair for the Web object) to the client device.

Notice that situations where the hashlist entry is missing the relevant item (Scenario in FIG. 5A), the system does not provide any cost savings or performance improvements over systems that relay all traffic through a remote cloud. Situations where a valid hashlist entry exists (Scenario in FIG. 5B) reduces user-perceived delays, and reduces the processing and bandwidth burden on the Turbo-SECaaS server. An incorrect (or more generally, non-matching) hashlist entry (Scenario of FIG. 5C) may harm the performance by increasing the user-perceived delays.

§4.5 EXAMPLE HASHLIST DISTRIBUTION PROTOCOLS

An example security server system 110 may provide the client hashlist (or information used to assemble the client hashlist) to client devices 130 using a hash-distribution protocol. The performance of hash-distribution protocols can be judged using two metrics. The first metric is the end user's perceived delay when retrieving a requested Web (e.g., HTTP) object. The delay is larger when requesting a Web object via the security server system 110 than when requesting it directly from the origin server. The second metric is the amount of network resources (e.g., bandwidth) consumed by the protocol to distribute the hashlist entries (or information used to build the client hashlist) from the security server system 110 to the client devices 130. With these two metrics in mind, three (3) hashlist distribution protocols are described in §§4.5.1-4.5.3 below—a push protocol, a pull protocol, and a hybrid push-pull protocol. In each of these three protocols, the number of Web objects retrieved and checked by the security server system 110 is the same. The protocols only differ in how the security server system 110 distributes hashlist entries to the client devices 130.

§4.5.1 Example Push Protocol for Hash List Distribution

Figure 6:
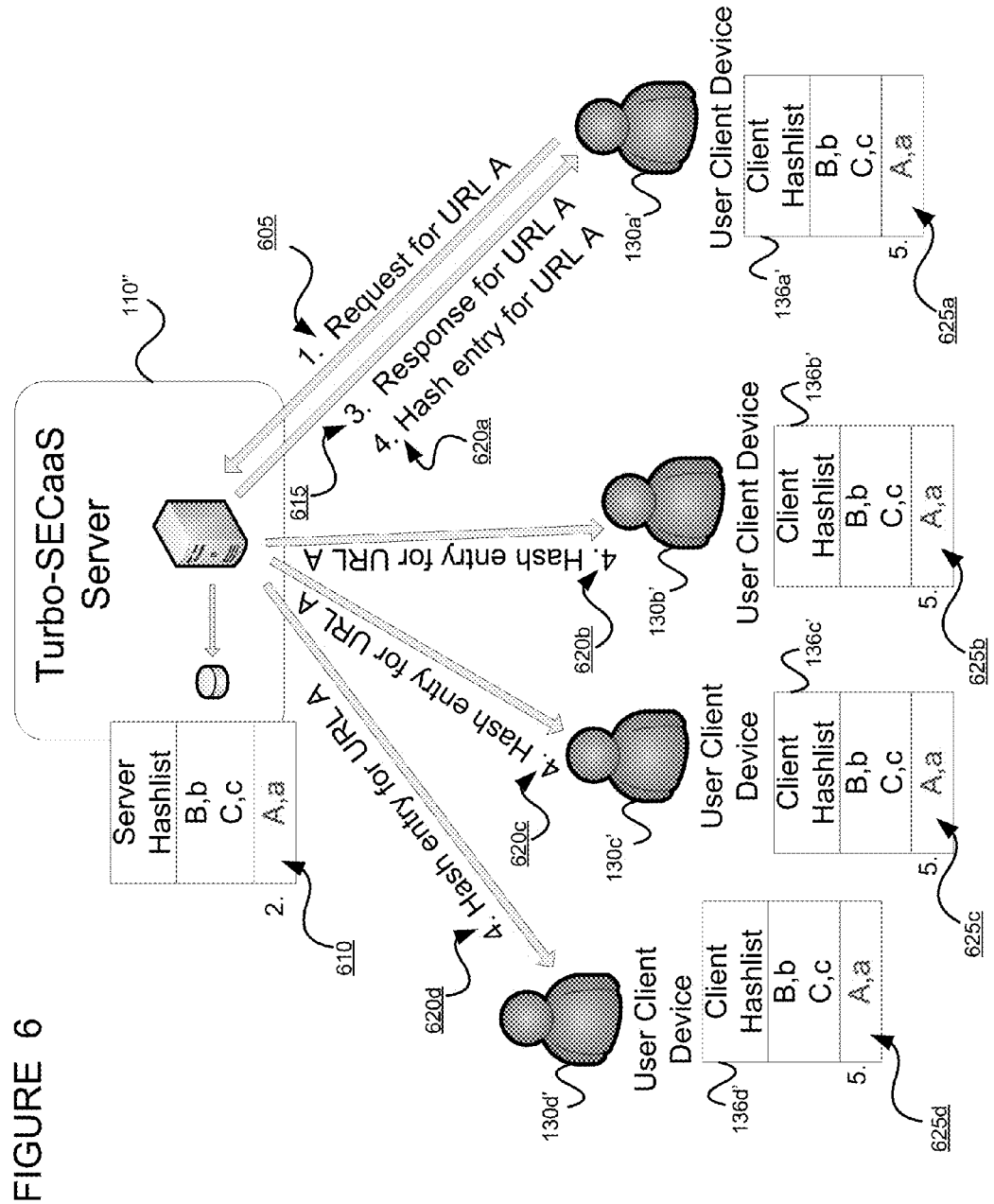
FIG. 6 illustrates a push hashlist distribution process.

The push distribution protocol minimizes user-perceived delay, but is not as concerned with the network bandwidth consumption for distributing the hashlist entries. With the push distribution protocol, whenever a hashlist entry is created at the security server system 110, it is pushed to all client devices 130. FIG. 6 illustrates the push distribution protocol. Initially, a user's client device 130$a'$ sends a request 605 for a particular URL A to the example Turbo-SECaaS server system 110". The example Turbo-SECaaS server system 110" fetches the content from the origin server (not shown) and creates a hashlist entry 610 for the URL A. After the example Turbo-SECaaS server system 110" sends the response 615 to the requesting user, it pushes 620$a$-620$d$ the hash entry to all the user client devices 130$a'$-130$d'$, and the hashlist entry 625$a$-625$d$ is updated in all the client hashlists 136$a'$-136$d'$.

As should be appreciated from the foregoing example, the push distribution protocol ensures that all client hashlists 136' are the same as the hashlist maintained at the example Turbo-SECaaS server system 110". However, some hash entries might not be used by some clients, and the network bandwidth used can be high. Thus, the push distribution protocol may waste network bandwidth. However, since the push protocol causes any request for a URL that has a hashlist entry to go directly to the origin server, it minimizes user-perceived delays and indeed may save some network bandwidth by preempting requests for the same Web object by multiple clients.

§4.5.2 Example Pull Protocol for Hash List Distribution

Figure 7:
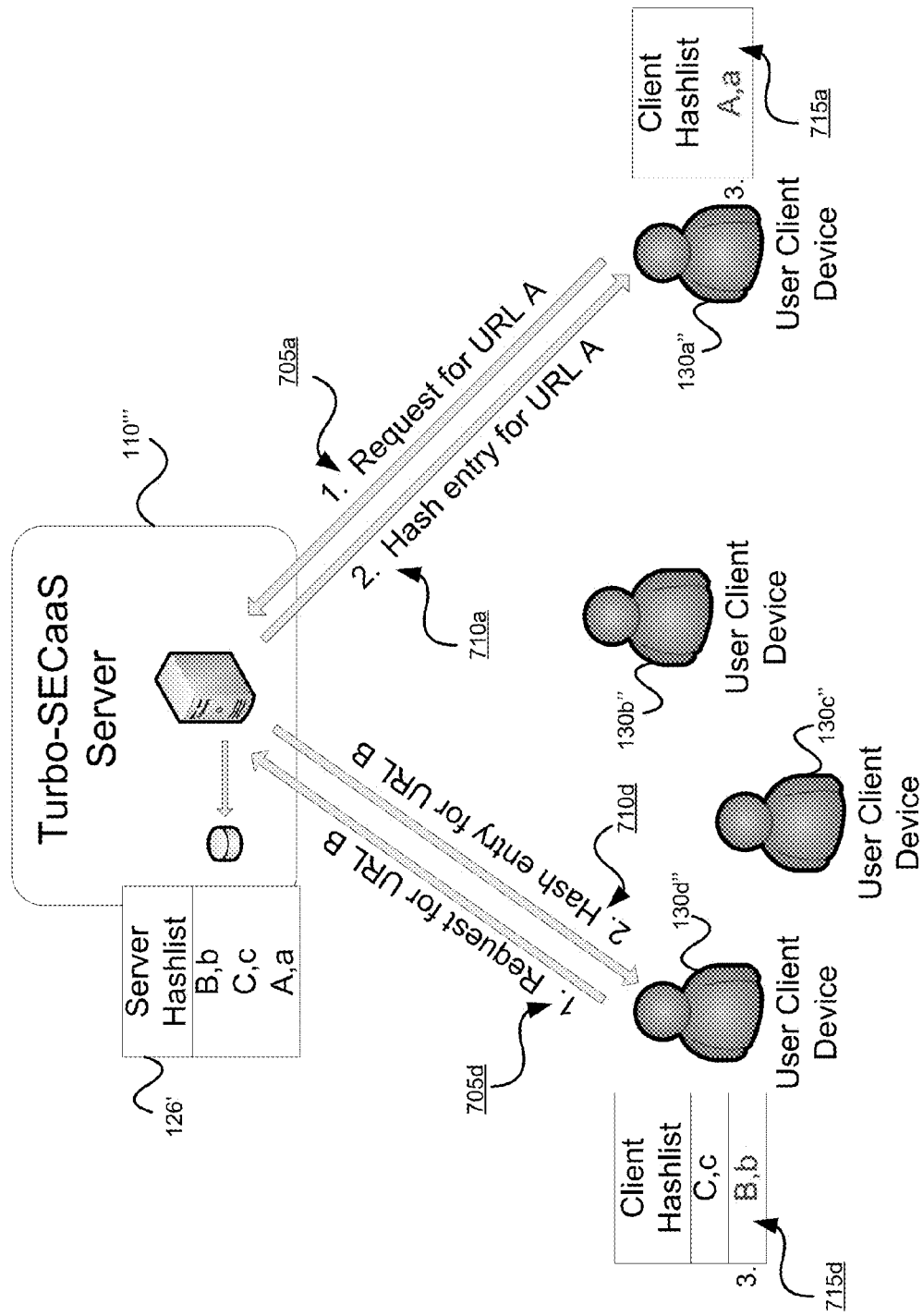
FIG. 7 illustrates a pull hashlist distribution process.

The pull distribution protocol minimizes network bandwidth consumption at the security server system 110. Referring to FIG. 7, with the pull distribution protocol, the security server system 110''' does not distribute the hashlist entries proactively; instead, user client devices 130 retrieve hashlist entries on-demand. As shown, a user's client device (See 130$a''$ and 130$d''$.) first sends its request (See 705$a$ and 705$d$.) to the security server system 110'''. If there is an entry in the server hashlist 126' for the requested URL, the security server system 110''' sends (See 710$a$ and 710$d$.) the hash entry to the client device (See 130$a''$ and 130$d''$.) and also redirects the client device to the origin server (not shown). The client device then stores the hashlist entry (See 715$a$ and 715$d$) and downloads the content from the origin server. The client device accepts the downloaded object only if the hashes match. If the hashes do not match, the client device might resend the request to the security server system 110''' citing a hash mismatch.

As should be appreciated from the foregoing, since a request for a hashlist entry is first sent to the security server system 110''' before the client device can request the object directly from the origin server, the total delay for that request will be larger than for the push distribution protocol. However, the aggregate network bandwidth used to distribute the hash entries to the clients is potentially much less because clients do not receive any unneeded hashlist entries.

§4.5.3 Example Hybrid Push-Pull Protocol for Hash List Distribution

The example Turbo-SECaaS server system 110' introduced in §4.3 above may implement a hybrid push-pull distribution protocol. The hybrid push-pull distribution protocol takes a middle ground approach between the two extremes of the push distribution protocol (under which the consideration of end user-perceived delays trumps any consideration of network bandwidth consumption) and the pull distribution protocol (under which the consideration of network bandwidth consumption trumps any consideration of end user-perceived delays) such that both low network bandwidth consumption and low end user-perceived delays are considered. More specifically, under the hybrid push-pull distribution protocol, the hashlist entries for some Web objects are pushed to all user client devices, whereas the hashlist entries for other Web objects are retrieved on demand (i.e., pulled). The degree to which one goal is given preference over the other (if at all) can be set or adjusted by configuring the value of a tunable parameter $\alpha$, as described below.

Figure 8:
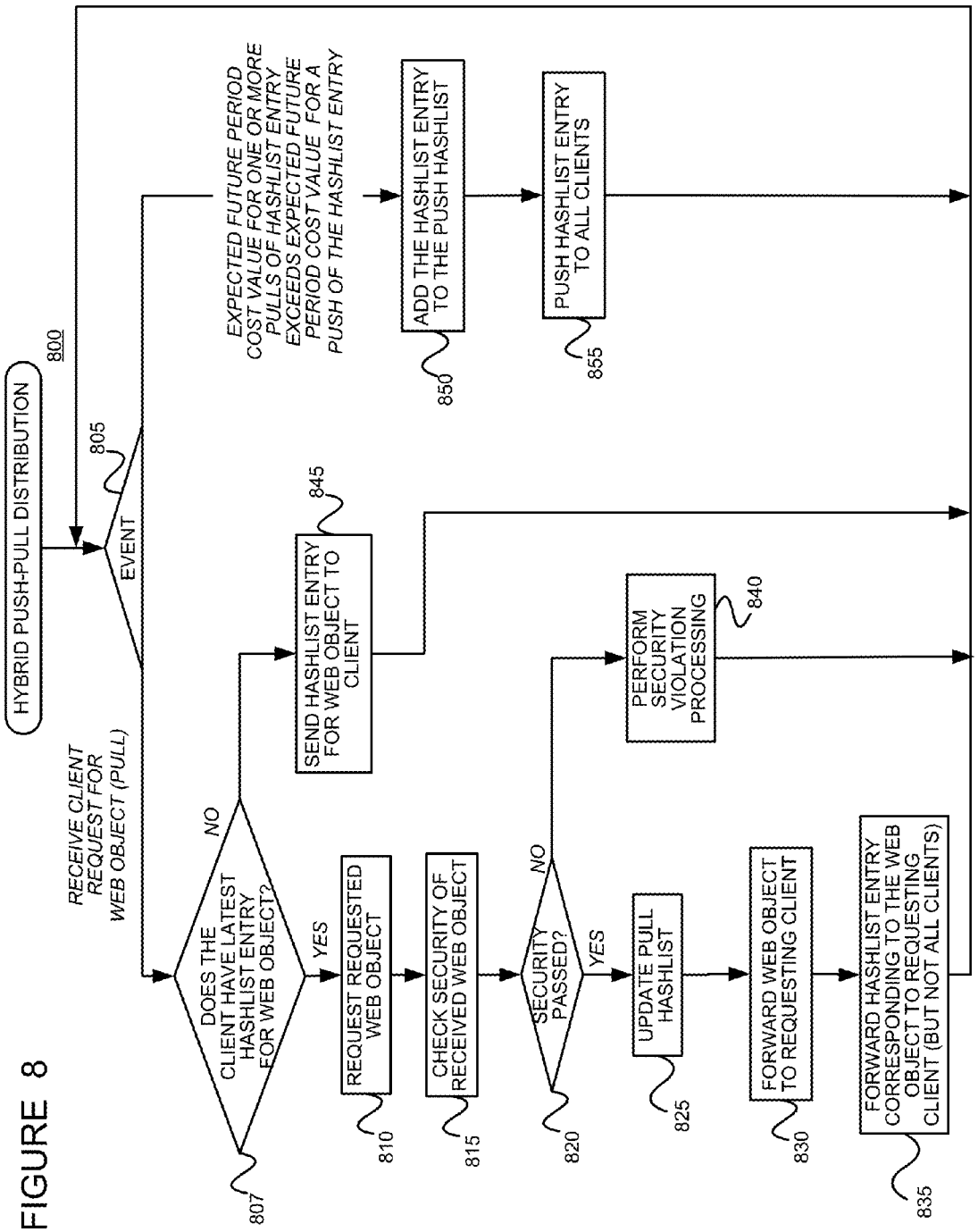
FIG. 8 is a flow diagram illustrating operations of an push-pull hybrid distribution method, consistent with the present invention.

FIG. 8 is a flow diagram illustrating operations of an push-pull hybrid distribution method 800, consistent with the present invention. Different branches of the method 800 are performed responsive to the occurrence of different events. (Element 805) In this example method 800, for a given URL, initially the hashlist entry is distributed on-demand using the pull approach. (See the left branch of the method 800.) However, when an expected future period cost value for one or more pulls of a hashlist entry exceeds an expected future period cost value for a push of the hashlist entry (e.g., when it is determined that there is a high demand for a Web object and the Web object is highly delay sensitive), the hashlist entry for the Web object is pushed to all the subscribed user client devices. (See the right branch of the method 800. More specifically, referring to FIG. 8, if a client request for a Web object is received (pull), the method 800 checks if the user device has the latest hashlist entry for the web object (e.g., 807 in FIG. 8). Depending on the result of comparison, if the client does not have the latest hashlist entry for the Web object (NO branch of 807), the server sends the hashlist entry to the client (Block 845). On the other hand, if the client does have the latest hashlist entry for the Web object (YES branch of 807), the method 800 requests the requested Web object from the origin server (Block 810) and checks the security of the requested Web object (Block 815). If the Web object passes security (YES branch of 820), a pull hashlist maintained at the security server system is updated (Block 825), the Web object is forwarded to the client device that requested it (Block 830) and/or a hashlist entry corresponding to the Web object is forwarded to the requesting user client device (but is not forwarded to all client devices) (Block 835). If, on the other hand, the Web object does not pass security (NO branch of 820), security violation processing is performed, which might include informing the user that the object has been blocked due to security violations. (Block 840) Referring back to 805, if it is determined that an expected future period cost value for one or more pulls of a hashlist entry exceeds an expected future period cost value for a push of the hashlist entry, the hashlist entry is added to a push hashlist maintained at the security server system (Block 850) and the hashlist entry is pushed to all client devices (Block 855).

Referring back to block 830, rather than forwarding the Web object to the requesting client device, the client device can request the Web object directly from the origin server and check its hash against the hashlist entry that it pulled from the security server system (Recall, e.g., Block 835.).

Referring back to block 855, rather than push a hashlist entry to all client devices, the method 800 could also push the hashlist entry to only those user client devices that will likely request the Web object (e.g., in the given future period). This likelihood may be determined using one or more attributes of the client device (such as a user language associated with the client device, a geographical location of the client device, a history of request patterns from the client device, etc.).

As can be appreciated from the foregoing, an example Turbo-SECaaS server 110' may, maintain two hashlists—a push hashlist and a pull hashlist. The server 110' sends all the entries in the push hashlist to all the client devices, but sends the entries in the pull hashlist to a client device only on demand by that client device. Over time, some objects from the pull hashlist will likely be moved to the push hashlist.

Referring back to the condition invoking the acts on the right side of the method 800 of FIG. 8, the security server system 110' determines when it is more beneficial to push a hashlist entry rather than let it be retrieved on demand (i.e., pulled) by client devices. In one example embodiment, the costs considered include (1) hashlist entry distribution cost and (2) end user perceived latencies. If the total expected future cost for the pull protocol is higher than the expected future cost for the push protocol, then it is more efficient to push the hashlist entry for that Web object. For the cost comparison, consider a Web object (in this example, a URL) for which a hashlist entry already exists in the example Turbo-SECaaS server system's 110' pull hashlist. Cost analysis variables are defined as follows:

n: number of client devices subscribed to the security service provided by the security server system;

m: number of client devices having requested the Web object so far;

f: estimated number of client devices that will request the Web object in a given future period;

$C_{delay}$: a cost of additional delay when retrieving a hashlist entry on demand; and $C_{bandwidth}$: a cost of bandwidth (e.g., network resources) for distributing a hashlist entry to a client device.

For the push protocol, the user client device will already have the hashlist entry for the desired URL. Consequently, there will be no delay caused by redirects. Accordingly, the total future cost when adding the URL to the push list is the cost of distributing the object hash entry to all the clients who haven't yet requested the object:

$$\text{Totalcost}_{Push} = (n-m) \times C_{bandwidth} \quad (1)$$

For the pull protocol, each user client device that wants the URL experiences an additional delay corresponding to requesting and receiving the hashlist entry from the security server system. There is also the network bandwidth cost in distributing the hashlist entry to the user client device. Therefore, at any given time, if the URL is acquired using the pull protocol, then the expected cost for distributing the Web object in the future period is:

$$\text{Totalcost}_{Pull} = f \times (C_{delay} + C_{bandwidth}) \quad (2)$$

For a given Web object, the security server system should switch from the pull protocol to the push protocol if the expected future period cost for pull exceeds the expected future period cost for push; that is, if:

$$\text{Totalcost}_{Pull} > \text{Totalcost}_{Push} \quad (3)$$

Substituting the variables and simplifying the terms yields the following condition:

$$f > \frac{(n-m) \times C_{bandwidth}}{C_{delay} + C_{bandwidth}} \quad (4)$$

Thus, if the expected number of future period requests for the Web object from different user client devices exceeds the above threshold, then the hybrid approach switches from the pull distribution protocol to the push distribution protocol for that particular Web object.

In the foregoing, $C_{delay}$ can be defined as the actual Round Trip Time (RTT) delay in contacting the security server system times a factor $\alpha$. That is:

$$C_{delay} = \alpha \times \text{RTT latency} \quad (5)$$

Figure 9:
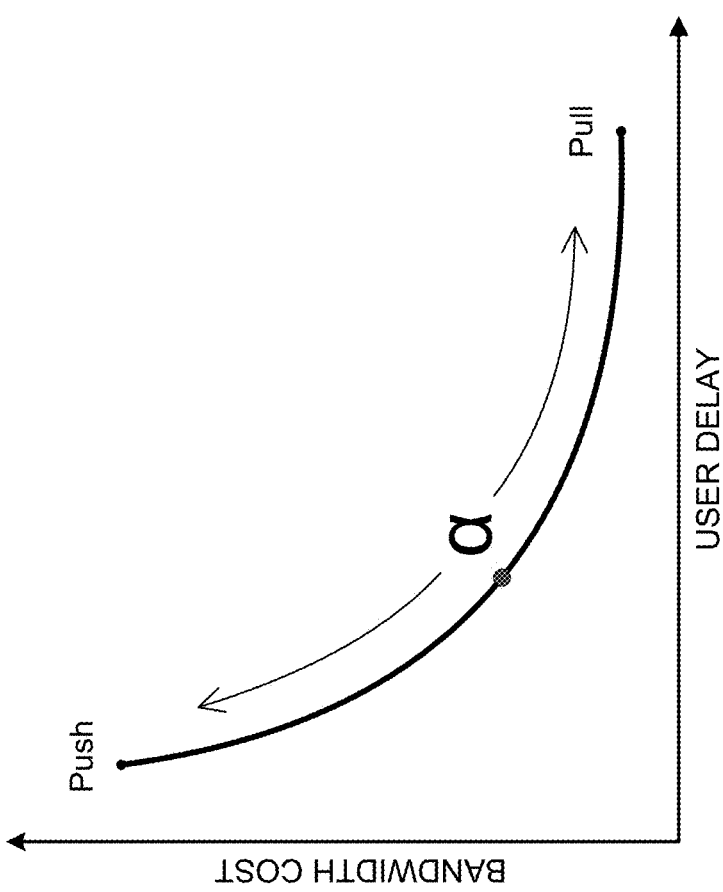
FIG. 9 illustrates the use a of parameter α to tune a hybrid push-pull hashlist distribution process.

Here, $\alpha$ is the tunable parameter that can be set and/or adjusted by an administrator. By setting a high value for a, the administrator places more value on user-perceived delay relative to network bandwidth costs. In this case, the security server system will switch to the push protocol for relatively small values of f. For low a values, the hashlist entry distribution bandwidth cost is given more weight. In this case, the security server system will continue with the pull protocol for relatively large values of f. The two extremes of the $\alpha$ value result in the pure push case and the pure pull case. As shown in FIG. 9, the parameter $\alpha$ allows the administrator to control where the security service lies on the curve joining the two extremes.

Although the approach described above was described in terms of URLs, it is applicable to Web objects as well.

To estimate the number of future requests f for a Web object, the entire history of Web object requests can be used, including the times when all the past requests for the Web object were made. In a simple example, f is estimated based on the number of users (e.g., distinct client devices) who have requested the Web object, referred to as "m". In a simple case, the linear estimator f=a×m+b that minimizes the least-squared error in logs (e.g., a web proxy log) of past Web object requests is used. More specifically, for each Web object in the logs, say given eight (8) weeks of request date, the number of requests expected to be seen in the last five (5) weeks of the eight (8) week period can be estimated from the requests in the first three (3) weeks of the eight (8) week period. Given this actual log data, the root mean square error can be minimized by appropriately setting the "a" and "b" coefficients of the linear estimator. In one experiment, the linear estimate was:

$$f = 1.4004 \times m - 1.206 \quad (6)$$

with a mean absolute error for this estimate being 0.8243, and root mean squared error being 2.3555.

In the foregoing example, once the administrator chooses the $\alpha$ value, the security server system tracks m (i.e., the number of users who have requested the object). Based on the estimate of f (e.g., using Equation 6), if Equation 4 is satisfied, the hashlist entry is distributed using the push protocol. Intuitively, this ensures that the hashlist entries of Web objects that are frequently requested are pushed out to minimize latency. The hashlist entries of Web objects that are rarely requested are pulled on demand instead.

One example hybrid push-pull distribution protocol distributes every new object using the pull protocol and keeps track of user client devices (where each user client device is identified by its IP address) requesting a Web object. When the number of users requesting the particular Web object exceeds the calculated threshold (based on $\alpha$), the security server system pushes the Web object to all the user client devices (or all user client devices that haven't requested the Web object yet).

§4.6 REFINEMENTS, ALTERNATIVES AND EXTENSIONS

Various refinements, alternatives and extensions to the example embodiments described above are now discussed in §§4.6.1-4.6.3 below.

§4.6.1 Enhancing Security and Privacy

Ways to enhance security and/or privacy are described in §§4.6.1.1-4.6.1.3 below.

§4.6.1.1 Thwarting Man-in-the-Middle Attackers

Without cryptographic protection, a man-in-the-middle ("MITM") could modify hashlist entries or URL responses. This can be addressed using a VPN (if available) or simply by tunneling connections through SSL/TLS. This ensures the integrity of the data provided by the security server system, with the additional bonus of making the client device requests to the security server system confidential.

As the main concern is to preserve the integrity (i.e., to ensure that data sent by the security server system is not modified in-transit), cryptographic signatures can also be used as a lightweight way to authenticate and ensure the integrity of messages sent from the security server system. To this end, the security server system's public key would be distributed to the client devices of all the end users of the service. Using this key, the security server system can sign every message (both Web objects and hashlist entries) and attach a timestamp and sequence number. After receiving the content, the Web object security module (or some additional module) on the client device can then verify the signature with the security server system's public key to ensure the timeliness, completeness, and integrity of the content.

§4.6.1.2 Hashlist Entry Revocation

One aspect of a whitelisting/blacklisting service is handling content revocation. More specifically, when there is a change in a security module's configuration (e.g., an antivirus or IDS signature update, etc.), previously validated content (e.g., Web objects) may no longer be trustworthy. One approach is to do nothing and allow any previously validated content to be trusted. While this approach has no overhead, the security of user devices is somewhat compromised.

Re-validating the hashlists whenever a security module's configuration changes is possible with a minor change to the example Turbo-SECaaS architecture. More specifically, to allow for content to be re-validated, the example Turbo-SECaaS server can cache any content it asserts is valid (much like a HTTP proxy would). Note that this can be provided using off-the-shelf HTTP proxy software. When the configuration of a security module has changed, all cached content is passed back through the security modules for re-validation. If re-validation detects that any content is no longer valid, the entry corresponding to such content is removed from the hashlist(s). In the case of pushed hashlist entries, a message for invalidating the entry is sent to all clients. In the case of pulled hashlist entries, the example Turbo-SECaaS server's hashlist has the appropriate entry removed, and a message is sent to appropriate clients. (Note that this can provide an ancillary benefit by informing the administrator which clients were previously subjected to malicious web content.) Since storage is limited for storing cached content, we might remove some validated content from cache for space reasons. If this occurs, the hashlist entries for validated but not cached Web objects must also be removed from the hashlists when a security module's configuration changes.

The cost of re-validation in this manner is not as large as it might seem. First of all, the example Turbo-SECaaS server and security modules are likely to be within the same cloud. As most institutional security boxes can process at rates of 10 Gbps (See, e.g., C. Sheth and R. Thakker, "Performance Evaluation and Comparative Analysis of Network Firewalls," 2011 *International Conference on Devices and Communications (ICDeCom).*, pp. 1-5 (Feb. 2011)(incorporated herein by reference), and "Cisco ASA 5500 Series Adaptive Security Appliances," at cisco.com/en/US/products/ps6120/prod_models_comparison.html#_tab-c (incorporated herein by reference).), it will not take long to re-validate content. Furthermore, the real expense with cloud network traffic comes from traffic entering or leaving the cloud, not cloud traffic within the same LAN. As a result, re-validation incurs little additional network cost.

Regardless of whether or not content is cached for revocation purposes, note that cached content is not provided to the client. Rather, the security server system still provides hashlist entries to the client device(s) to allow it to retrieve content from fast sources, like content distribution network ("CDN") nodes.

§4.6.1.3 Privacy Concerns

The privacy offered by example embodiments consistent with the present invention is similar to that offered by a standard HTTP proxy. When using a web proxy, if an end user observes that a Webpage loads relatively fast, the user can assume that the object was cached at the proxy. Similarly, in example embodiments consistent with the present invention, when an end user (possibly malicious) receives a hash entry for a URL, the user knows that the object was requested before by some other user and has been scanned. As the hash entries distributed do not contain any user identifying information (such as IP addresses), a malicious user cannot determine which other users have requested the Web object earlier. Even for the push case, in which the security server system proactively distributes hashes, any possibly malicious end user can only know that the object is popular (requested by many users); such an end user does not know which users requested the Web object.

To prevent eavesdropping of hashlist entries received by a user, the entries can be encrypted by the security server system (as described above) before they are shared with remote users.

§4.6.1.4 Execution-Based Malware Detection

The example Turbo-SECaaS architecture might use standard signature based protections. The deployed security filters provide protection against known malicious software. However, new types of malware frequently appear, making it difficult to detect every possible attack. Execution based malware detection techniques (See, e.g., A. Moshchuk, T. Bragin, D. Deville, S. D. Gribble, and H. M. Levy, "SpyProxy: Execution-based Detection of Malicious Web Content," *Proceedings of* 16*th USENIX Security Symposium on USENIX Security Symposium.* pp. 3:1-3:16 (Berkeley, Calif., USA: USENIX Association, 2007), [Online]. Available at: dl.acm.org/citation.cfm?id=1362903.1362906 (incorporated herein by reference), and Z. Li, Y. Tang, Y. Cao, V. Rastogi, Y. Chen, B. Liu, and C. Sbisa, "WebShield: Enabling Various Web Defense Techniques without Client Side Modifications," *Proceedings of the Network and Distributed System Security Symposium.* (NDSS 2011, San Diego, Calif., USA, 6 Feb.-9 Feb. 2011. The Internet Society, 2011)(incorporated herein by reference).), allow for detection of new unknown malware. However, such techniques should be deployed in a way that does not introduce undesired latencies.

§4.6.2 Blacklisting URLs

The number of hash mismatches can be reduced significantly by modifying the way hash mismatches are handled. Apart from maintaining the URL and content hash pairs for scanned Web objects, the security server system can add URLs that have changed their hash frequently to a blacklist, thereby preventing these URLs from getting into either the push hashlist or the pull hashlist. Similar to push hashlist entries, the security server system can proactively broadcast new additions to the blacklist and inform its clients to redirect all requests for blacklisted URLs to the security server system. This ensures that all Web objects whose hashes change frequently are always requested through the cloud. More specifically, the inventors believe that most of the hash-changing URLs incur a single change over a reasonably large time period (e.g. a week), and only very few Web objects change hashes frequently. With the foregoing blacklisting approach, all these requests would now be retrieved through the cloud all the time.

§4.6.3 Per User Client Device or Per User Client Device Group Adjustment of Tunable Parameter $\alpha$ In the push-pull hybrid distribution protocol discussed in §4.5.3 above, the tunable parameter $\alpha$ was described as allowing a security server system administrator to decide upon the deployment costs and the user performance guarantees. In such a system, once the $\alpha$ value is chosen, it is fixed for all the user client devices of the security server system. However, it may be useful to give each user (or group of users) the opportunity to manage preferences based on the environment of their respective client device. For example, if an end user is subscribed to the security service on a client device which has a constrained network traffic allowance (like some smartphone data plans), then such a user might prefer the pull protocol to reduce the network bandwidth consumption and may wish to adjust the $\alpha$ parameter accordingly. If, on the other hand, network bandwidth is not a limitation, an end user may prefer the hybrid approach or the push approach to improve the overall performance, and may wish to adjust the $\alpha$ parameter accordingly. Hence, it may be useful to provide the end user (or a group of end users) with an option to vary preferences (e.g., using a slider like feature) to switch between different modes. Alternatively, a security server system administrator or some other agent for the end user may make such adjustments on behalf of the end user or group of end users.

§4.7 CONCLUSIONS

Example embodiments consistent with the present invention provide the remote end user client devices with the ability to discern content that has been allowed by the remote cloud protections, despite the malicious actions of network operators, servers, and/or other clients. That is, such embodiments should provide robust security even if the origin servers serving the HTTP objects return malicious objects, other third parties on the network path (like ISPs, DNS servers, and other network devices) are malicious and modify traffic going to the security server system or to the destination clients, and/or other users of the security service are malicious.

Example embodiments consistent with the present invention provide a novel system to improve the performance of remotely provided security services. An example security server system consistent with the present invention can provide remote client devices the same security protections as cloud-based security scanning (i.e., the security of always relaying user HTTP traffic through a remote cloud security service), while often providing HTTP performance more typical of an (insecure) direct connection. Apart from providing security and performance benefits to remote users, example embodiments consistent with the present invention reduce server deployment costs, thereby handling more users with the same resources.

Despite the fact that a significant amount of web content is dynamic, the present inventors expect the relative number of hash mismatches to be small. This is because the system performance does not specifically depend on Web object content changes alone, but on how many requests are made for a Web object between its content changes. Traces from a public Web proxy service indicate that, in practice, the number of requests is significantly higher than the number of object content changes.

Example embodiments consistent with the present invention ensure that only non-malicious Web objects reach applications (e.g., a Web browser) on an end user's client device.

By distributing hashes of verified Web objects to user client devices, the user experience is improved while the cost of the cloud deployment is simultaneously reduced. This all occurs without reducing the security offered by a traditional cloud service.

What is claimed is:

1. A method for reducing user-experienced latencies and server costs encountered when all requested Web objects by a client device must otherwise pass through a security server system, the method comprising:
    a) generating, by the security server system, a list of at least one {validated Web object identifier, validated Web object hash value} pair;
    b) forwarding at least a part of the list to the client device;
    c) receiving, by the client device, the at least part of the list;
    d) storing, by the client device, the at least part of the list received in a client list of at least one {validated Web object identifier, validated Web object hash value} pair; and
    e) responsive to a request for a Web object by an application at the client device,
        1) determining, by the client device, whether or not the requested Web object is included in the client list, and
        2) responsive to a determination, by the client device, that the requested Web object is included in the clientlist,
            A) fetching, by the client device, the requested Web object from an origin server,
            B) receiving, by the client device, the Web object,
            C) computing, by the client device, a hash of the received Web object,
            D) comparing, by the client device, the computed hash with the hash paired with the requested Web object included in the client list, and
            E) responsive to a determination, by the client device, that the computed hash matches the hash paired with the requested Web object included in the client list,
                i) passing, by the client device, the requested Web object to the application, otherwise, responsive to a determination, by the client device, that the computed hash does not match the hash paired with the requested Web object included in the client list, and ii) requesting, by the client device, the requested Web object via the security server system.

2. The method of claim 1 further comprising, responsive to a determination, by the client device, that the requested Web object is not included in the client list, (A) requesting, by the client device, at least one of the requested Web object via the security server system, or a {validated Web object identifier, validated Web object hash value} pair from the security server system.

3. The method of claim 1 wherein the list is forwarded to the client device and other client devices in accordance with a hybrid push-pull hashlist distribution protocol including 1) maintaining, by the security server system, both
   a pull hashlist including hashes for Web objects to be provided to a client device on demand from the client device, and
   a push hashlist including hashes for Web objects to be provided to a client device regardless of whether or not the client device requested the Web object, and 2) responsive to a determination, by the security server system, that an expected future period cost value for one or more pulls of a {validated Web object identifier, validated Web object hash value} pair on the pull hashlist exceeds an expected future period cost value for a push of the {Web object, hash value} pair, adding the {validated Web object identifier, validated Web object hash value} pair to the push hashlist.

4. The method of claim 3 wherein the expected future period cost for one or more pulls of a {validated Web object identifier, validated Web object hash value} pair is defined as $f \times (C_{delay} + C_{bandwidth})$, where "f" is defined as an estimated number of clients that will request the Web object in the future period, "$C_{delay}$" is defined as a cost of an additional delay encountered when retrieving a hash entry on demand and "$C_{bandwidth}$" is defined as a cost of network resources used to distribute a hash entry.

5. The method of claim 4 wherein the estimated number "f" of clients that which request the Web object in the future period is a linear estimator that minimizes a least square error of estimates generated from a log of actual client requests.

6. The method of claim 3 wherein the expected future period cost for one or more pulls of a {validated Web object identifier, validated Web object hash value} pair is defined as $f \times (C_{delay} + C_{bandwidth})$, where "f" is defined as an estimated number of clients that which request the Web object in the future period, "$C_{bandwidth}$" is defined as a cost of network resources used to distribute a hash entry, and "$C_{delay}$" is defined as the product of (1) a tunable parameter α and (2) a cost of an additional delay encountered when retrieving a hash entry on demand.

7. The method of claim 3 wherein the expected future period cost for the push distribution of a {validated Web object identifier, validated Web object hash value} pair is defined as $(n-m) \times (C_{bandwidth})$, where "n" is defined as a number of clients served by the security server system, "m" is defined as a number of clients that have already requested the Web object, and "$C_{bandwidth}$" is defined as a cost of network resources used to distribute a hash entry.

8. The method of claim 1 wherein the act of fetching, by the client device, the requested Web object from the origin server is performed directly, thereby bypassing the security server system.

9. The method of claim 1 wherein the validated Web object identifier is a URL of a validated Webpage.

10. The method of claim 1 wherein the validated Web object identifier is a hashed URL of a validated Webpage.

11. A method for reducing user-experienced latencies and server costs encountered when all requested Web objects by a client device must otherwise pass through a security server system, the method comprising:

a) receiving, by the client device, the at least part of a list, generated by the security server system, of at least one {validated Web object identifier, validated Web object hash value} pair;

b) storing, by the client device, the at least part of the list received in a client list of at least one {validated Web object identifier, validated Web object hash value} pair; and c) responsive to a request for a Web object by an application at the client device,
   1) determining, by the client device, whether or not the requested Web object is included in the client list, and
   2) responsive to a determination, by the client device, that the requested Web object is included in the clientlist,
      A) fetching, by the client device, the requested Web object from an origin server,
      B) receiving, by the client device, the Web object,
      C) computing, by the client device, a hash of the received Web object,
      D) comparing, by the client device, the computed hash with the hash paired with the requested Web object included in the client list, and
      E) responsive to a determination, by the client device, that the computed hash matches the hash paired with the requested Web object included in the client list,
         i) passing, by the client device, the requested Web object to the application, otherwise, responsive to a determination, by the client device, that the computed hash does not match the hash paired with the requested Web object included in the client list, and
         ii) requesting, by the client device, the requested Web object via the security server system.

12. The method of claim 11 further comprising, responsive to a determination, by the client device, that the requested Web object is not included in the client list, (A) requesting, by the client device, at least one of the requested Web object via the security server system, or a {validated Web object identifier, validated Web object hash value} pair from the security server system.

13. The method of claim 11 wherein the act of fetching, by the client device, the requested Web object from the origin server is performed directly, thereby bypassing the security server system.

14. The method of claim 11 wherein the validated Web object identifier is a URL of a validated Webpage.

15. The method of claim 11 wherein the validated Web object identifier is a hashed URL of a validated Webpage.

16. A non-transitory storage device storing processor-executable code which, when executed by the at least one processor, causes the at least one processor to perform a method for reducing user-experienced latencies and server costs encountered when all requested Web objects by a client device must otherwise pass through a security server system, the method 1) receiving, by the client device, the at least part of a list, generated by the security server system, of at least one {validated Web object identifier, validated Web object hash value} pair, 2) storing, by the client device, the at least part of the list received in a client list of at least one {validated Web object identifier, validated Web object hash value} pair, and
3) responsive to a request for a Web object by an application at the client device,
   A) determining, by the client device, whether or not the requested Web object is included in the client list, and
   B) responsive to a determination, by the client device, that the requested Web object is included in the clientlist,
      i) fetching, by the client device, the requested Web object from an origin server,
      ii) receiving, by the client device, the Web object,
      iii) computing, by the client device, a hash of the received Web object,
      iv) comparing, by the client device, the computed hash with the hash paired with the requested Web object included in the client list, and
      v) responsive to a determination, by the client device, that the computed hash matches the hash paired with the requested Web object included in the client list,
         passing, by the client device, the requested Web object to the application,
         otherwise, responsive to a determination, by the client device, that the computed hash does not match the hash paired with the requested Web object included in the client list, and
         requesting, by the client device, the requested Web object via the security server system.

17. A method for reducing user-experienced latencies and server costs encountered when all requested Web objects by a client device must otherwise pass through a security server system, the method comprising:
   a) generating, by the security server system, a list of at least one pair entry, each of the at least one pair entries including a {validated Web object identifier, validated Web object content hash value} pair which indicates that the validated Web object identified has passed a security check; and
   b) transmitting, by the security server system, at least one pair entry of the list to the client device, thereby enabling the client device to determine whether or not a desired Web object has been validated by the security server system by comparing a hash of the desired Web Object with the validated Web Object content hash value of the at least one pair entry.

18. The method of claim 17 wherein the list is forwarded to the client device and other client devices in accordance with a hybrid push-pull hashlist distribution protocol including 1) maintaining, by the security server system, both
   a pull hashlist including hashes for Web objects to be provided to a client device on demand from the client device, and
   a push hashlist including hashes for Web
   objects to be provided to a client device regardless of whether or not the client device requested the Web object, and
2) responsive to a determination, by the security server system, that an expected future period cost value for one or more pulls of a {validated Web object identifier, validated Web object hash value} pair on the pull hashlist exceeds an expected future period cost value for a push of the {Web object, hash value} pair, adding the {validated Web object identifier, validated Web object hash value} pair to the push hashlist.

19. The method of claim 18 wherein the expected future period cost for one or more pulls of a {validated Web object identifier, validated Web object hash value} pair is defined as $f \times (C_{delay} + C_{bandwidth})$, where "f" is defined as an estimated number of clients that will request the Web object in the future period, "$C_{delay}$" is defined as a cost of an additional delay encountered when retrieving a hash entry on demand and "$C_{bandwidth}$" is defined as a cost of network resources used to distribute a hash entry.

20. The method of claim 19 wherein the estimated number "f" of clients that which request the Web object in the future period is a linear estimator that minimizes a least square error of estimates generated from a log of actual client requests.

21. The method of claim 18 wherein the expected future period cost for one or more pulls of a {validated Web object identifier, validated Web object hash value} pair is defined as $f \times (C_{delay} + C_{bandwidth})$, where "f" is defined as an estimated number of clients that which request the Web object in the future period, "$C_{bandwidth}$" is defined as a cost of network resources used to distribute a hash entry, and "$C_{delay}$" is defined as the product of (1) a tunable parameter α and (2) a cost of an additional delay encountered when retrieving a hash entry on demand.

22. The method of claim 18 wherein the expected future period cost for the push distribution of a {validated Web object identifier, validated Web object hash value} pair is defined as $(n-m) \times (C_{bandwidth})$, where "n" is defined as a number of clients served by the security server system, "m" is defined as a number of clients that have already requested the Web object, and "$C_{bandwidth}$" is defined as a cost of network resources used to distribute a hash entry.

* * * * *